(12) United States Patent  
Hamano

(10) Patent No.: US 7,616,385 B2
(45) Date of Patent: Nov. 10, 2009

(54) ZOOM LENS AND IMAGE PICKUP APPARATUS INCLUDING THE SAME

(75) Inventor: Hiroyuki Hamano, Koga (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 11/869,671

(22) Filed: Oct. 9, 2007

(65) Prior Publication Data

US 2008/0144188 A1 Jun. 19, 2008

(30) Foreign Application Priority Data

Dec. 14, 2006 (JP) ............................... 2006-336968

(51) Int. Cl.
*G02B 15/14* (2006.01)
(52) U.S. Cl. ...................... 359/683; 359/695
(58) Field of Classification Search .......... 359/680–706
See application file for complete search history.

(56) References Cited

U.S. PATENT DOCUMENTS

| 6,025,962 | A | 2/2000 | Suzuki |
| 6,081,389 | A | 6/2000 | Takayama |
| 6,275,342 | B1 | 8/2001 | Sakamoto |
| 6,404,561 | B1 | 6/2002 | Isono |
| 6,594,087 | B2 | 7/2003 | Uzawa |
| 7,088,521 | B2 | 8/2006 | Hamano |
| 2006/0109557 | A1 | 5/2006 | Maetaki |
| 2006/0221460 | A1 | 10/2006 | Saruwatari |

FOREIGN PATENT DOCUMENTS

| CN | 1782774 | 6/2006 |
| EP | 1659422 | 5/2006 |
| JP | 2004-061679 | 2/2004 |
| JP | 2004-117826 | 4/2004 |

*Primary Examiner*—Alicia M Harrington
(74) *Attorney, Agent, or Firm*—Canon USA Inc IP Div

(57) ABSTRACT

A zoom lens performs zooming by moving a plurality of lens units, and includes a front lens unit disposed on an object side of an aperture stop and at least one diffractive optical part having positive power, and a rear lens unit disposed on an image side of the aperture stop including at least one refractive optical element made of a solid material and having a positive refractive power. When νd and θgF are the Abbe number and the partial dispersion ratio, respectively, of the material of the refractive optical element, and fD and fN are the focal lengths of the diffractive optical part and the refractive optical element, respectively, in air, the following expressions are satisfied:

$0.755 < \theta gF - (-1.665 \times 10^{-7} \cdot \nu d^3 + 5.213 \times 10^{-5} \cdot \nu d^2 - 5.656 \times 10^{-3} \cdot \nu d) < 1.011$, and $80 < fD/fN < 800$.

7 Claims, 19 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The present invention is suitable, for example, for digital cameras, video cameras, and film cameras.

2. Description of the Related Art

Recently, in image pickup elements used in image pickup apparatuses, such as digital cameras, the number of pixels has been increasing. Accordingly, photographing lenses (image pickup optical systems) for use in image pickup apparatuses including image pickup elements with large number of pixels are required to have a high resolution.

In high-resolution photographing lenses, various aberrations, such as a spherical aberration and a coma aberration, that affect monochrome image quality must be accurately corrected.

In addition, chromatic aberrations must also be accurately corrected so that color bleeding does not occur in an image obtained when white light is used as illuminating light.

Also, to obtain a large imaging area, zoom lenses with a high zoom ratio are desirable for photographing lenses. In general, as the focal length at the telephoto end is increased in order to increase the zoom ratio, chromatic aberration of magnification is increased at the wide-angle zoom position, and both chromatic aberration of magnification and axial chromatic aberration are increased at the telephoto zoom position.

Therefore, in order to achieve a high image quality, it is important to perform accurate correction not only for a first-order spectrum but also for a secondary spectrum.

Generally, various structures for correcting the secondary spectrum of chromatic aberrations at the telephoto end are known. In such a structure, among lens units included in a zoom lens, a lens unit near an object side includes a lens formed of anomalous partial dispersion glass.

For example, U.S. Pat. No. 7,088,521 discusses a structure in which chromatic aberrations are corrected by placing a replica layer (refractive optical element) having anomalous partial dispersion characteristics in a zoom lens.

Zoom lenses that correct chromatic aberrations using a diffractive optical part (diffractive optical surface) instead of using an anomalous partial dispersion material are also known.

For example, zoom lenses are known which include a plurality of diffractive optical parts arranged in front of and behind an aperture of the optical system (Japanese Patent Laid-Open No. 2004-117826, U.S. Pat. Nos. 6,275,342, and 6,081,389).

Also, zoom lenses having a four-lens-unit structure including, in order from the object side, a lens unit having a positive refractive power, a lens unit having a negative refractive power, a lens unit having a positive refractive power, and a lens unit having a positive refractive power are known.

U.S. Pat. Nos. 6,404,561 and 6,594,087 discuses zoom lenses that have the above-described four-lens-unit structure and that correct chromatic aberrations using an anomalous dispersion glass.

Zoom lenses having a five-lens-unit structure including, in order from the object side, a lens unit having a positive refractive power, a lens unit having a negative refractive power, a lens unit having a positive refractive power, a lens unit having a negative refractive power, and a lens unit having a positive refractive power are also known (U.S. Pat. No. 6,025,962).

In general, when a zoom ratio of a zoom lens is increased, variation and magnitude of chromatic aberrations that occur during zooming are increased. In particular, the secondary spectrum of axial chromatic aberration and chromatic aberration of magnification is increased at the telephoto side and it becomes difficult to accurately correct the secondary spectrum.

The chromatic aberrations at the telephoto side can be reduced by an anomalous dispersion effect obtained by placing a diffractive optical part in a lens unit near the object side.

However, when the chromatic aberrations at the telephoto side are corrected by placing a diffractive optical part in a lens unit near the object side, the chromatic aberrations at the wide-angle end cannot be effectively corrected by the diffractive optical part. On the contrary, if the refractive power of the diffractive optical part is increased to greatly reduce the chromatic aberrations at the telephoto side, the chromatic aberration of magnification at the wide-angle end is increased.

In comparison, the chromatic aberrations can be easily corrected at both the wide-angle end and the telephoto end by placing a plurality of diffractive optical parts in the optical system or by placing an optical component having high anomalous dispersion characteristics near the image plane side.

In general, diffraction efficiency of a diffraction grating varies in accordance with the incidence angle of light rays. Therefore, in a zoom lens with light-ray incidence conditions that vary during zooming, there is a risk that the diffraction efficiency will be reduced during zooming unless the position at which the diffraction grating is disposed is adequately set.

In addition, if the chromatic aberrations of the optical system are to be corrected only by the diffractive optical part, it is difficult to increase the image quality by correcting the chromatic aberrations over the entire zoom area while increasing the zoom ratio.

To obtain high optical performance by accurately correcting the chromatic aberrations over the entire zoom area while increasing the zoom ratio, it is important to adequately set the positions of the diffractive optical part and the lens made of anomalous partial dispersion material, optical characteristics thereof, etc.

SUMMARY OF THE INVENTION

The present invention provides a zoom lens with high optical performance that can adequately correct aberrations including chromatic aberrations over the entire zoom area and an image pickup apparatus including the zoom lens.

According to embodiments of the present invention, a zoom lens performs zooming by moving a plurality of lens units. The zoom lens includes a front lens unit disposed on an object side of an aperture stop, the front lens unit including at least one diffractive optical part having positive power; and a rear lens unit disposed on an image side of the aperture stop, the rear lens unit including at least one refractive optical element made of a solid material and having a positive refractive power. When $\nu d$ and $\theta gF$ are the Abbe number and the partial dispersion ratio, respectively, of the material of the refractive optical element, and fD and fN are the focal lengths of the diffractive optical part and the refractive optical element, respectively, in air, the following expressions are satisfied:

$$0.755 < \theta gF - (-1.665 \times 10^{-7} \cdot vd^3 + 5.213 \times 10^{-5} \cdot vd^2 - 5.656 \times 10^{-3} \cdot vd) < 1.011, \text{ and}$$

$$80 < fD/fN < 800.$$

Further features of the present invention will become apparent from the following description of exemplary embodiments with reference to the attached drawings.

DESCRIPTION OF THE EMBODIMENTS

Figure 1:
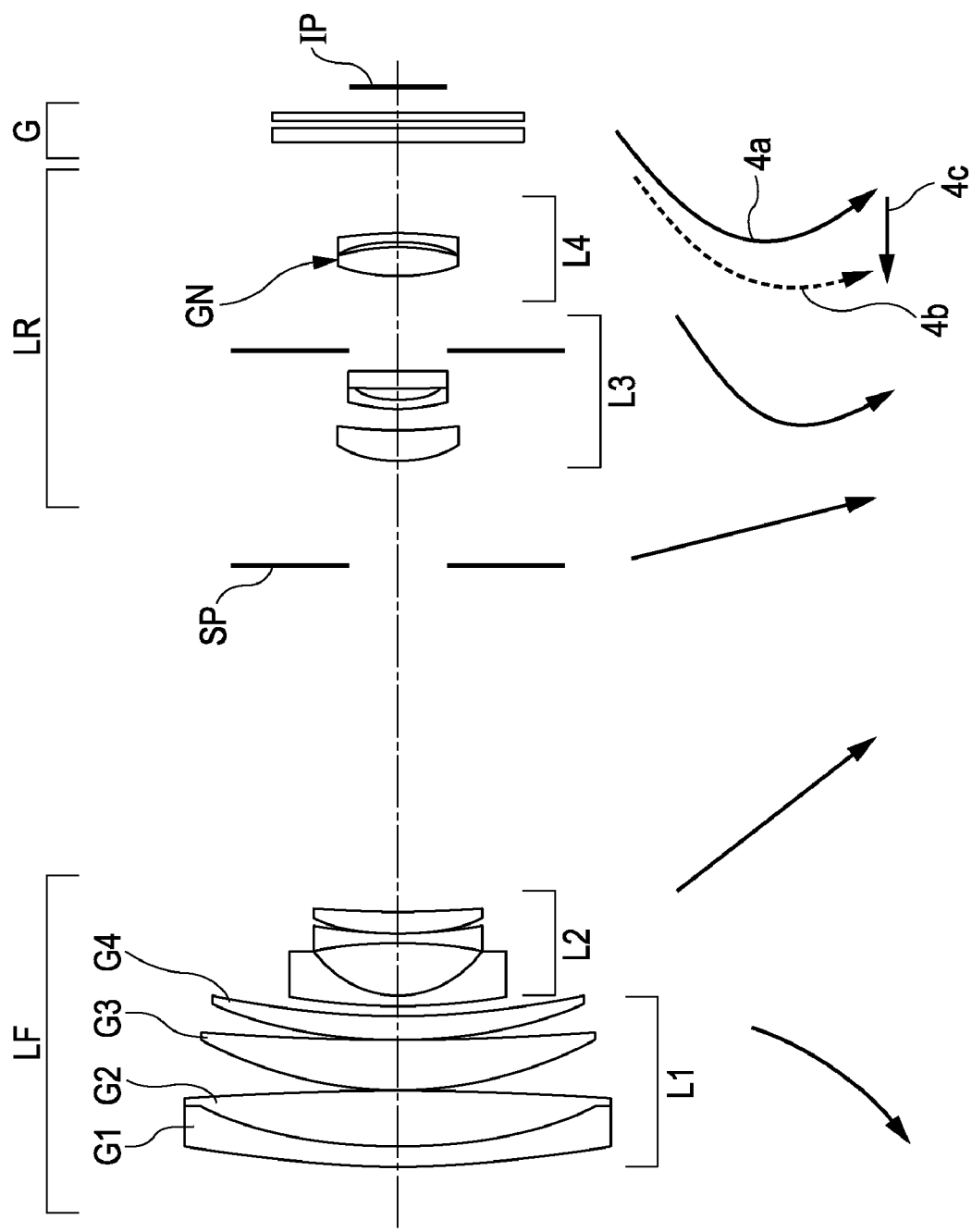
FIG. 1 is a sectional view of a lens according to a first embodiment.
Figure 2:
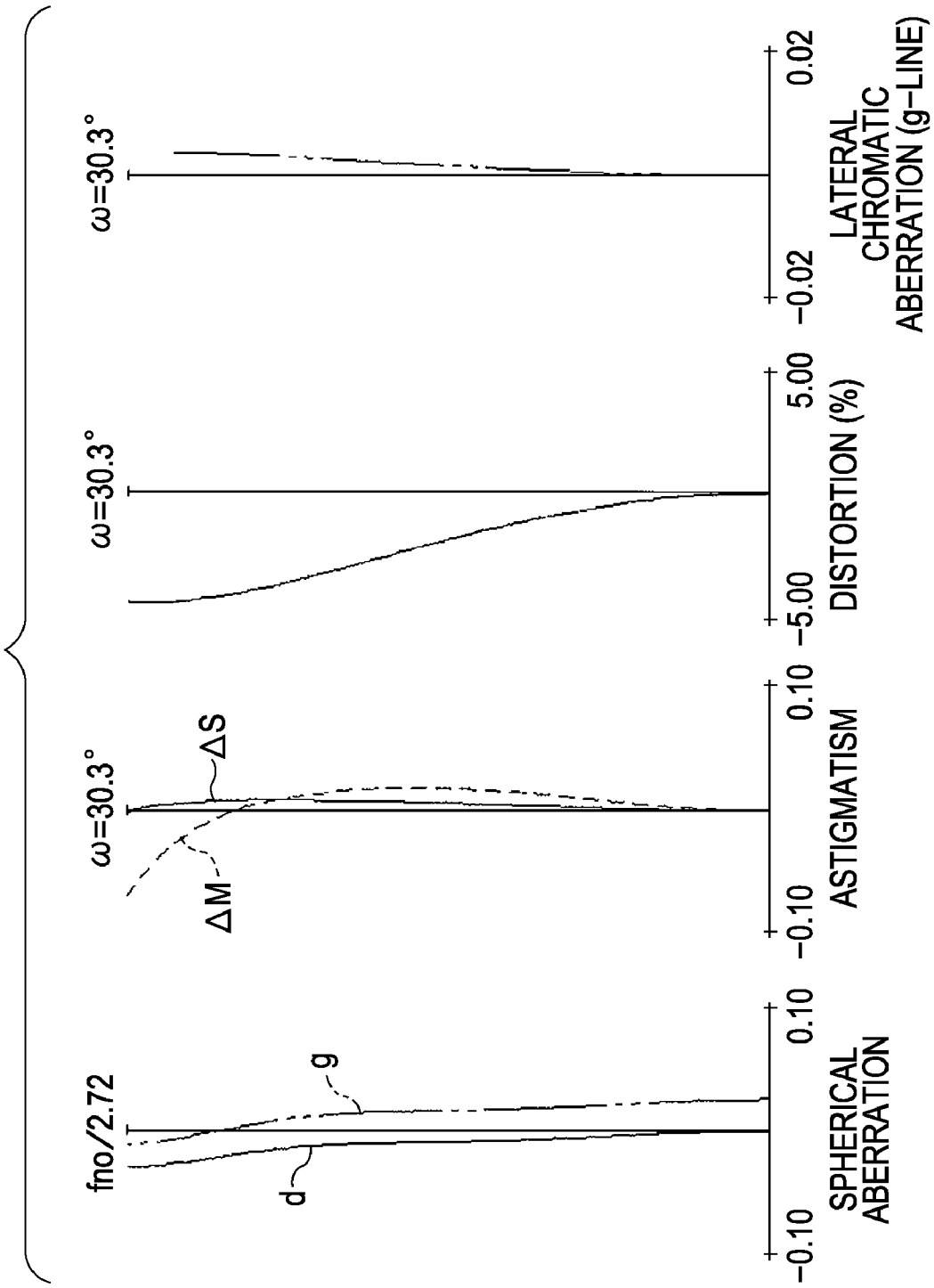
FIG. 2 illustrates aberration diagrams at a wide-angle end according to the first embodiment.
Figure 3:
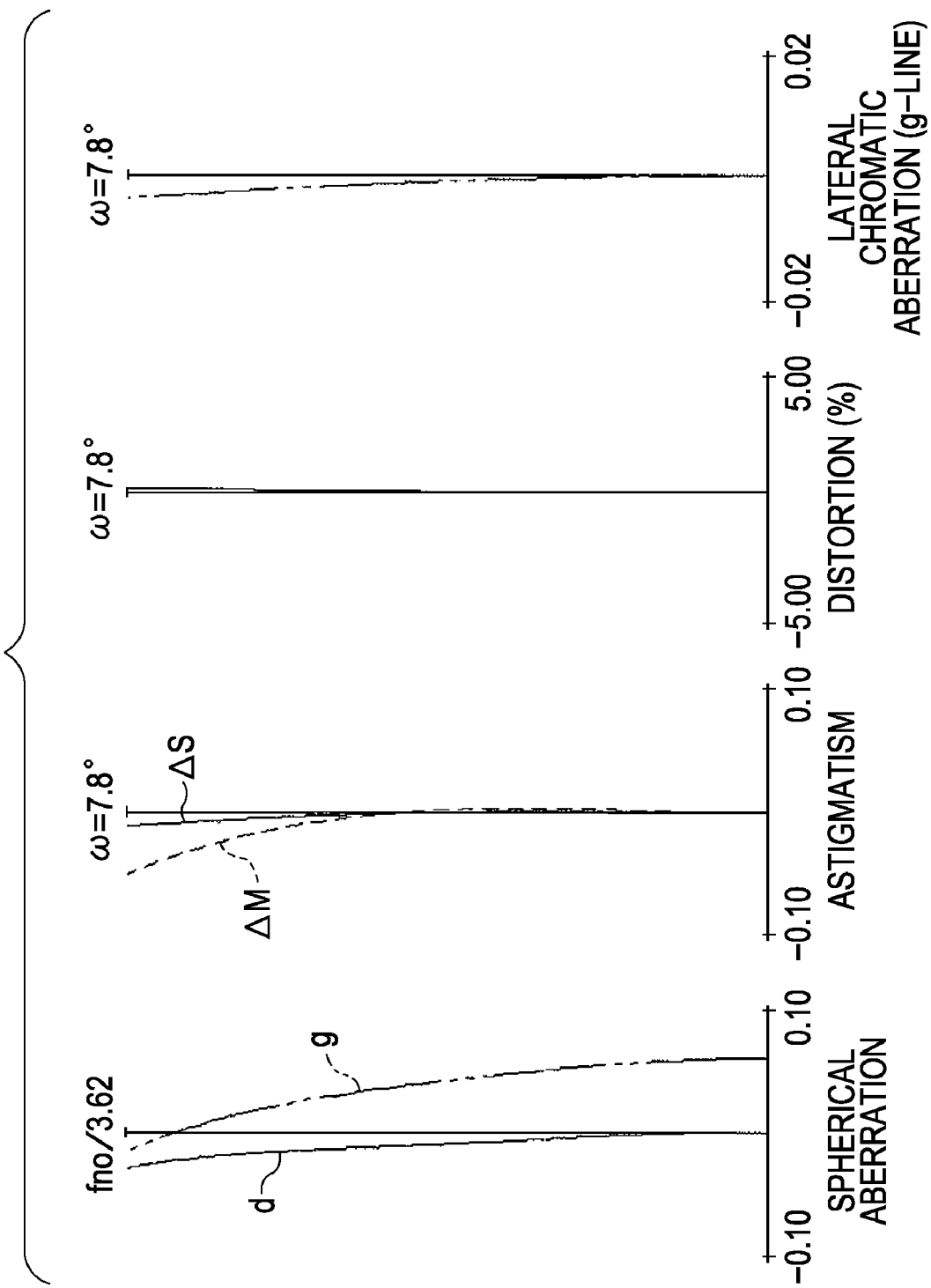
FIG. 3 illustrates aberration diagrams at a middle focal-length position according to the first embodiment.
Figure 4:
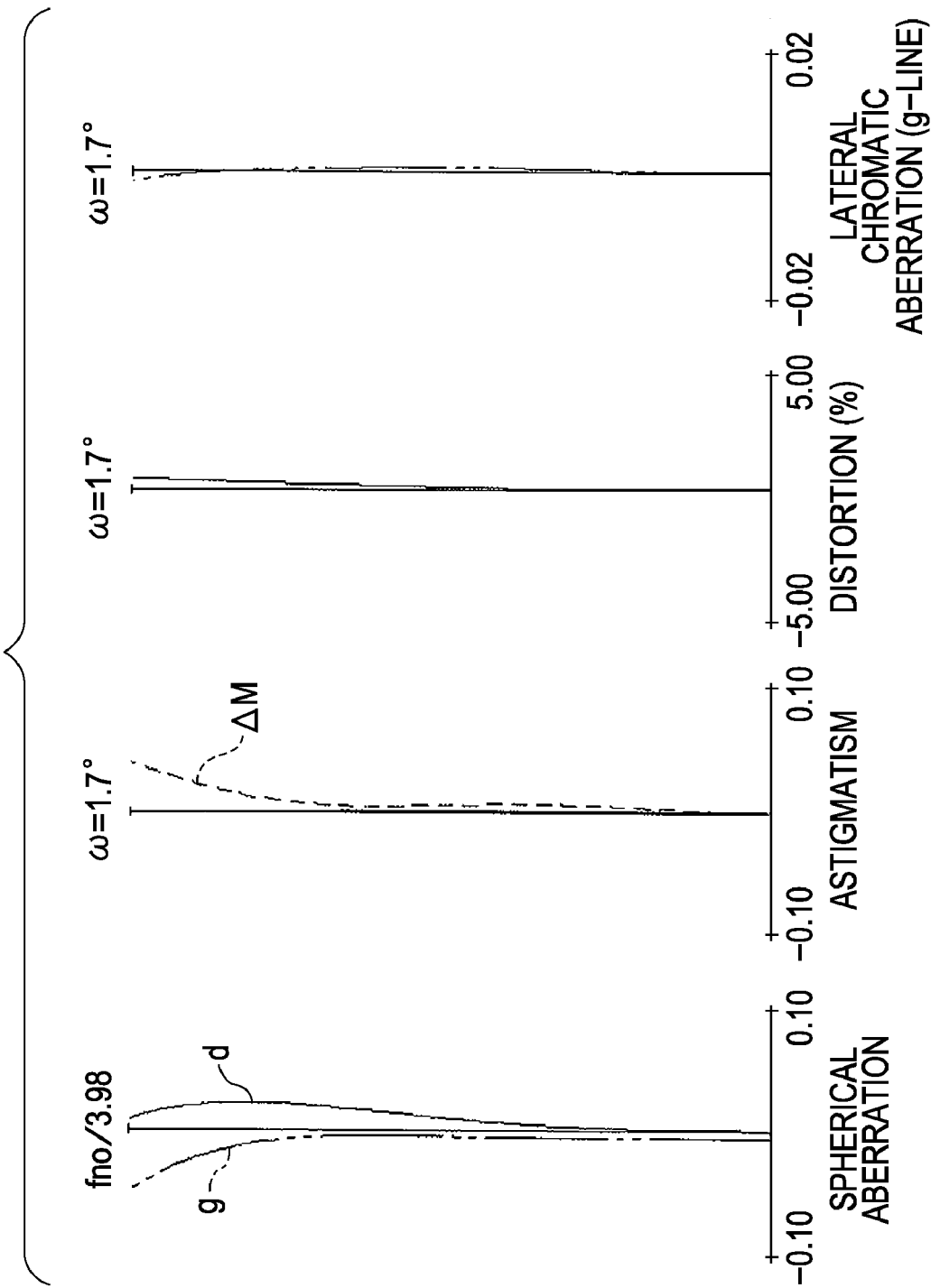
FIG. 4 illustrates aberration diagrams at a telephoto end according to the first embodiment.

FIG. 1 is a sectional view of a zoom lens according to a first embodiment of the present invention at a wide-angle end (short-focal-length end). FIGS. 2, 3, and 4 are aberration diagrams of the zoom lens according to the first embodiment at the wide-angle end, a middle zoom position, and a telephoto end (long-focal-length end), respectively.

Figure 5:
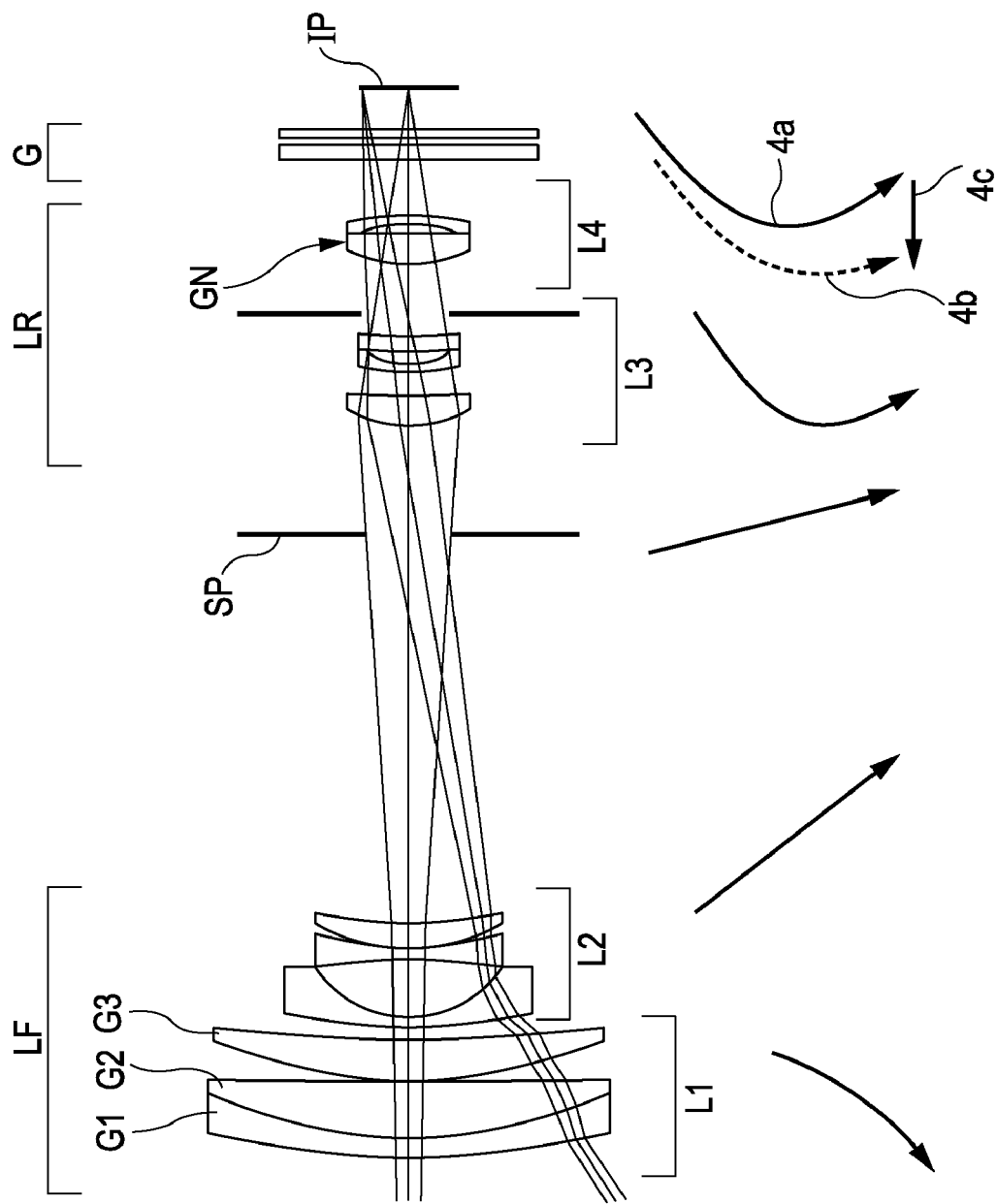
FIG. 5 is a sectional view of a lens according to a second embodiment.
Figure 6:
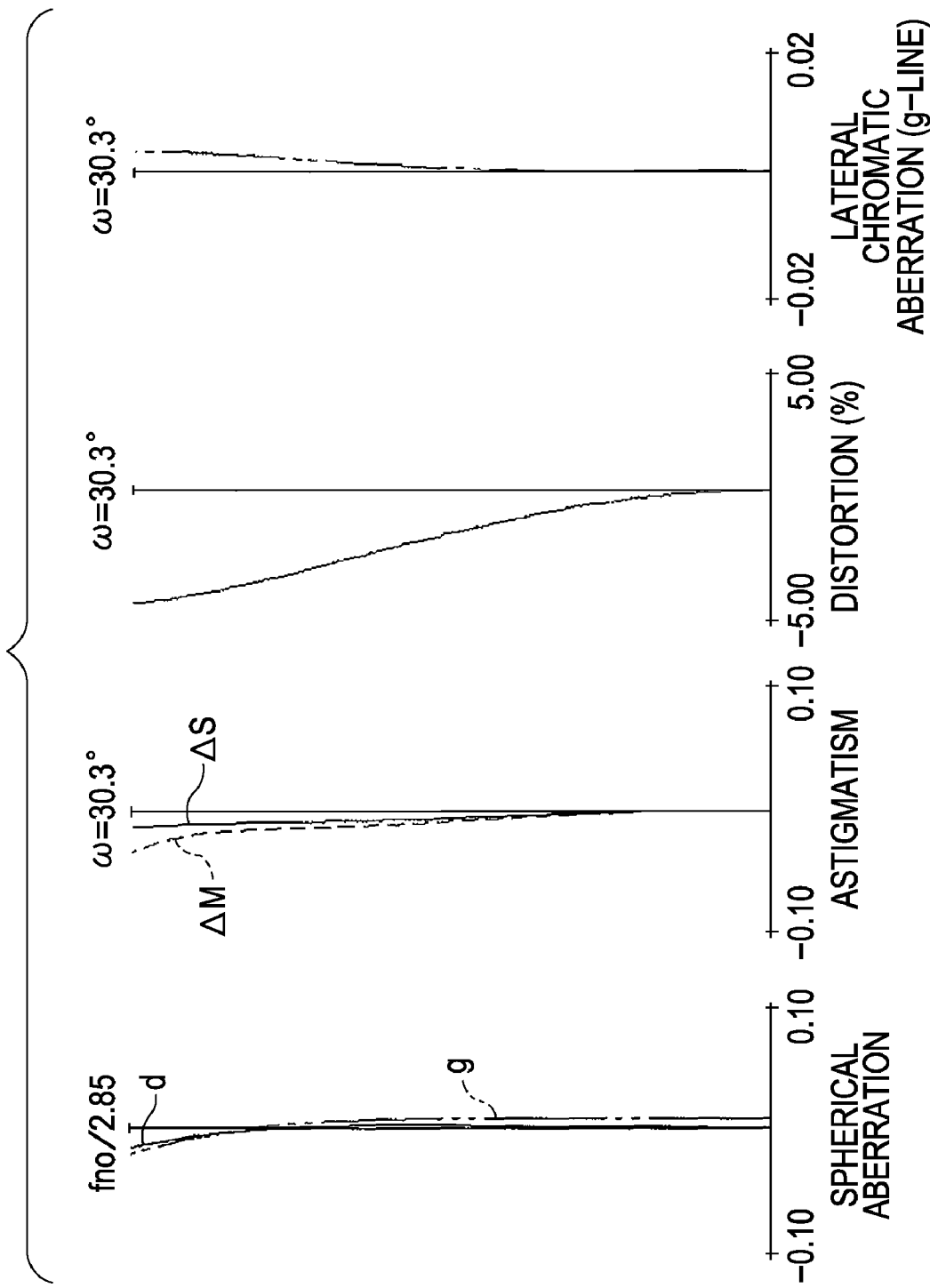
FIG. 6 illustrates aberration diagrams at a wide-angle end according to the second embodiment.
Figure 7:
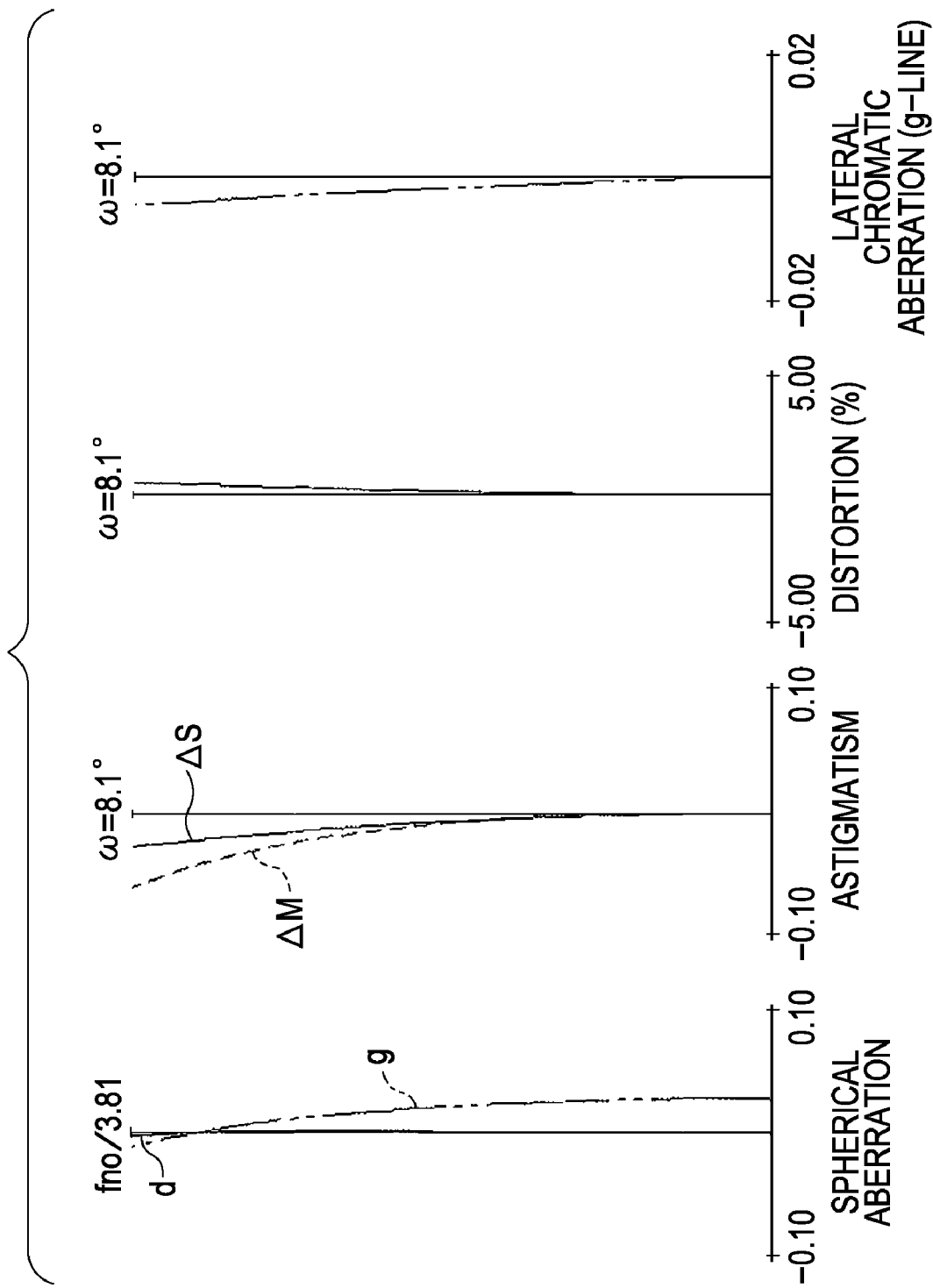
FIG. 7 illustrates aberration diagrams at a middle focal-length position according to the second embodiment.
Figure 8:
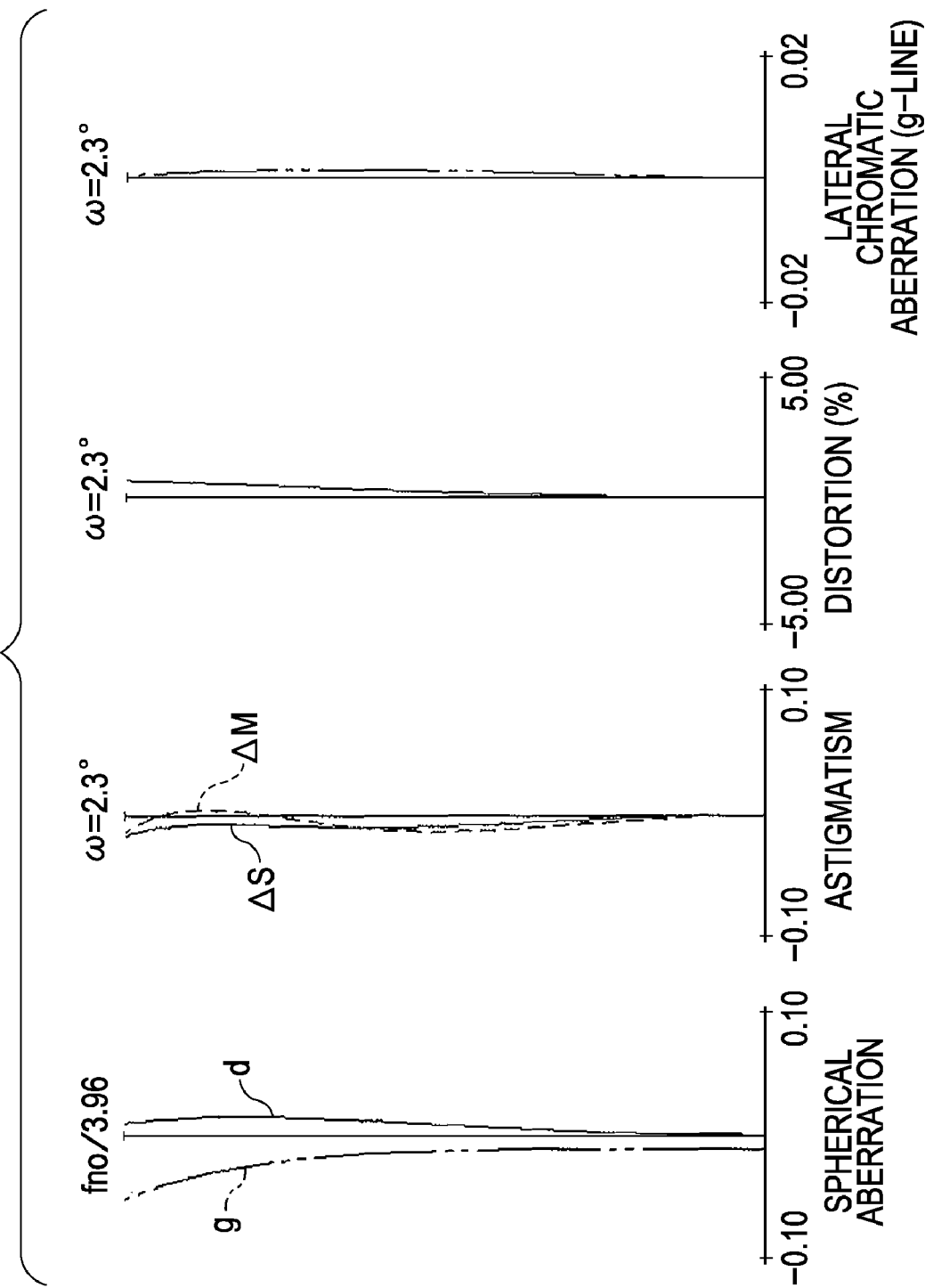
FIG. 8 illustrates aberration diagrams at a telephoto end according to the second embodiment.

FIG. 5 is a sectional view of a zoom lens according to a second embodiment of the present invention at a wide-angle end. FIGS. 6, 7, and 8 are aberration diagrams of the zoom lens according to the second embodiment at the wide-angle end, a middle zoom position, and a telephoto end, respectively.

Figure 9:
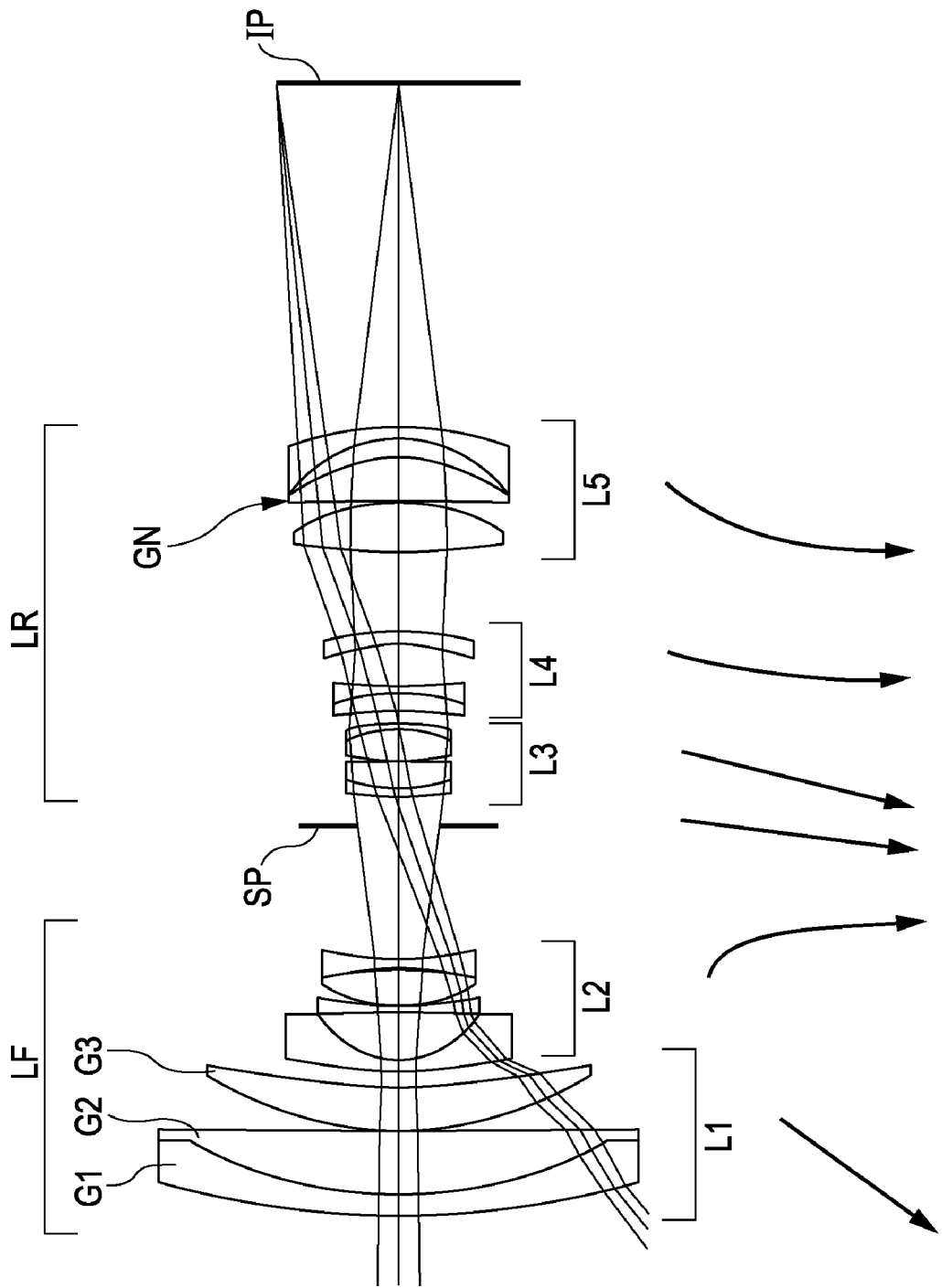
FIG. 9 is a sectional view of a lens according to a third embodiment.
Figure 10:
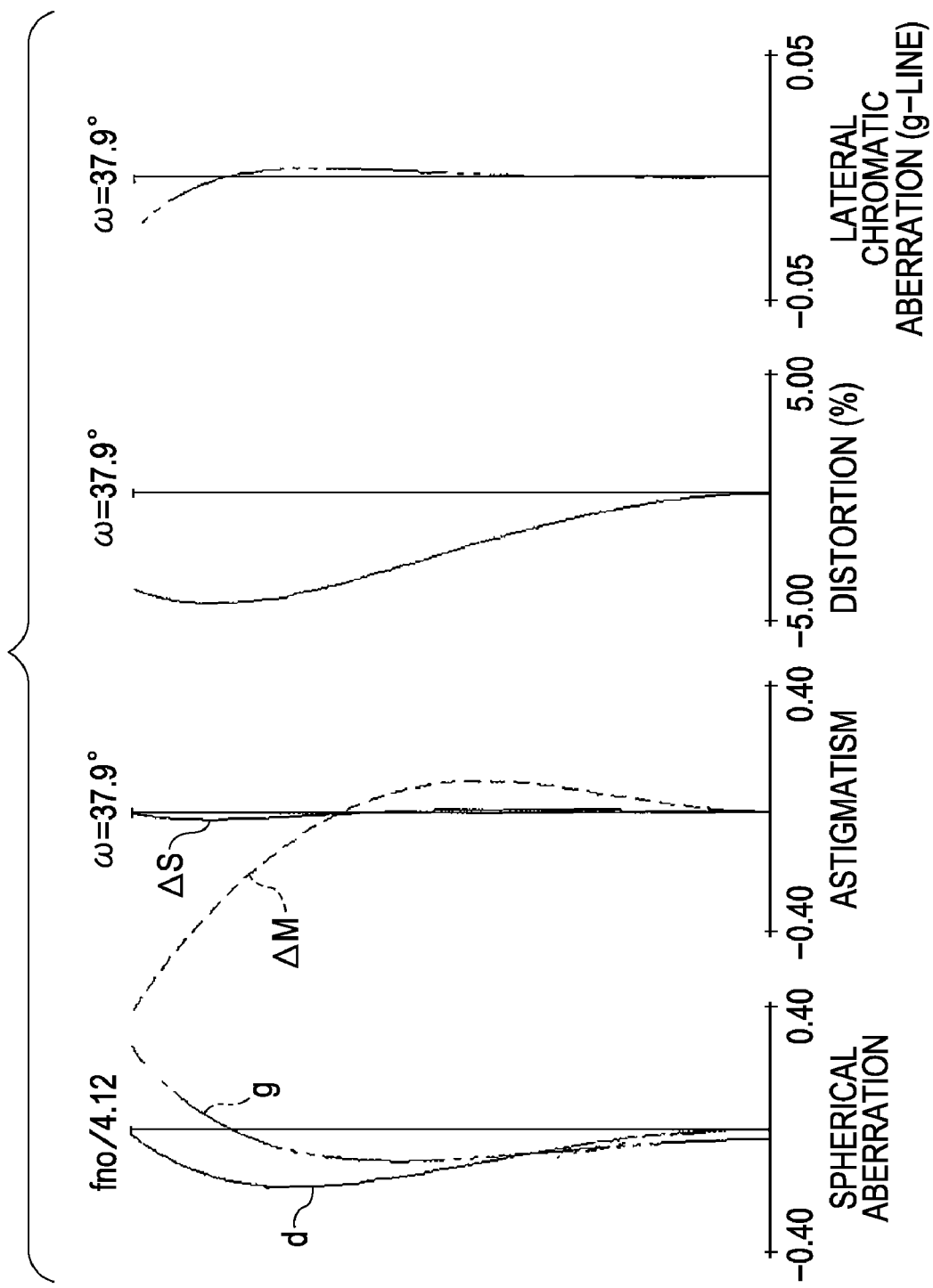
FIG. 10 illustrates aberration diagrams at a wide-angle end according to the third embodiment.
Figure 11:
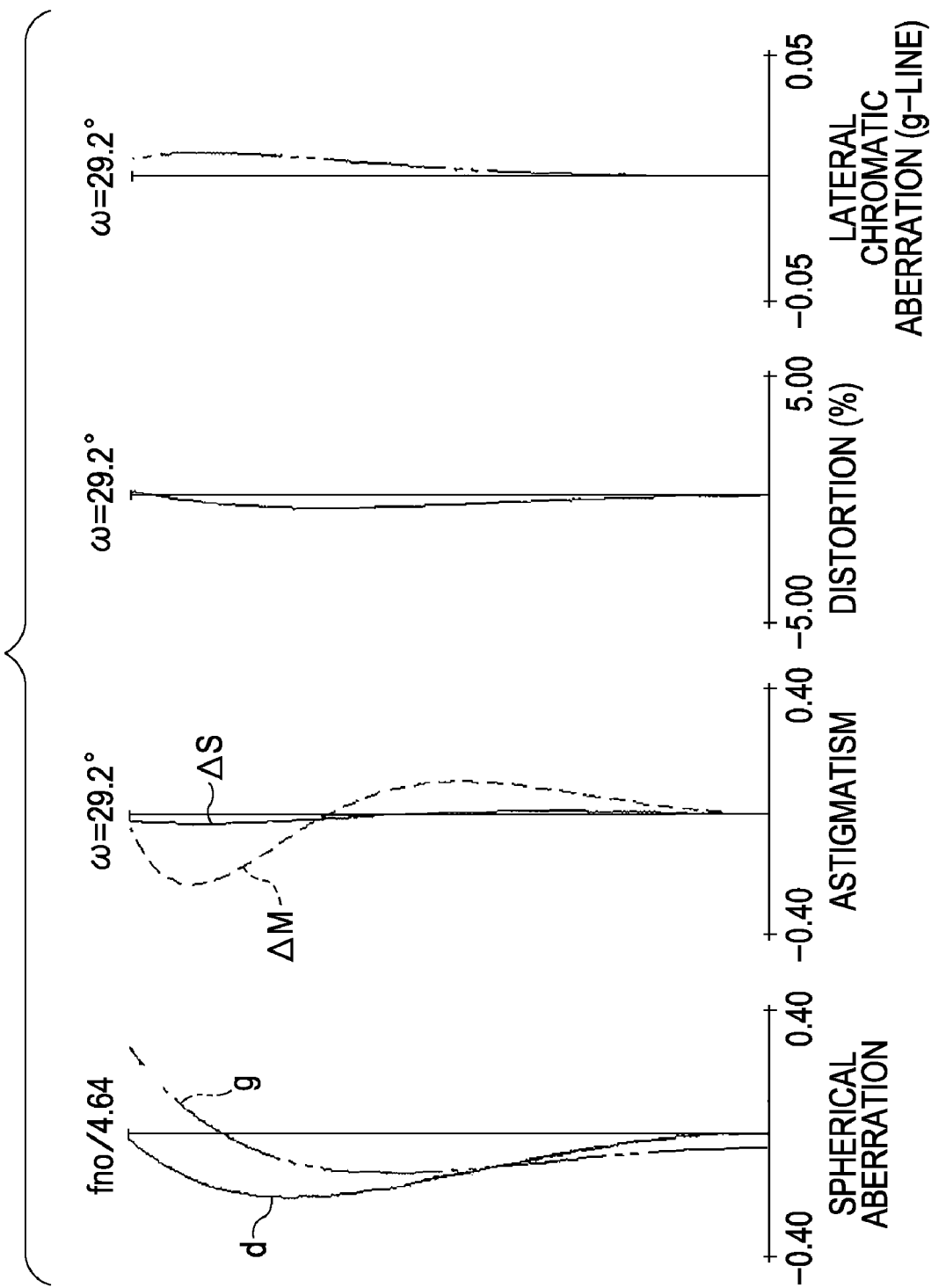
FIG. 11 illustrates aberration diagrams at a middle focal-length position according to the third embodiment.
Figure 12:
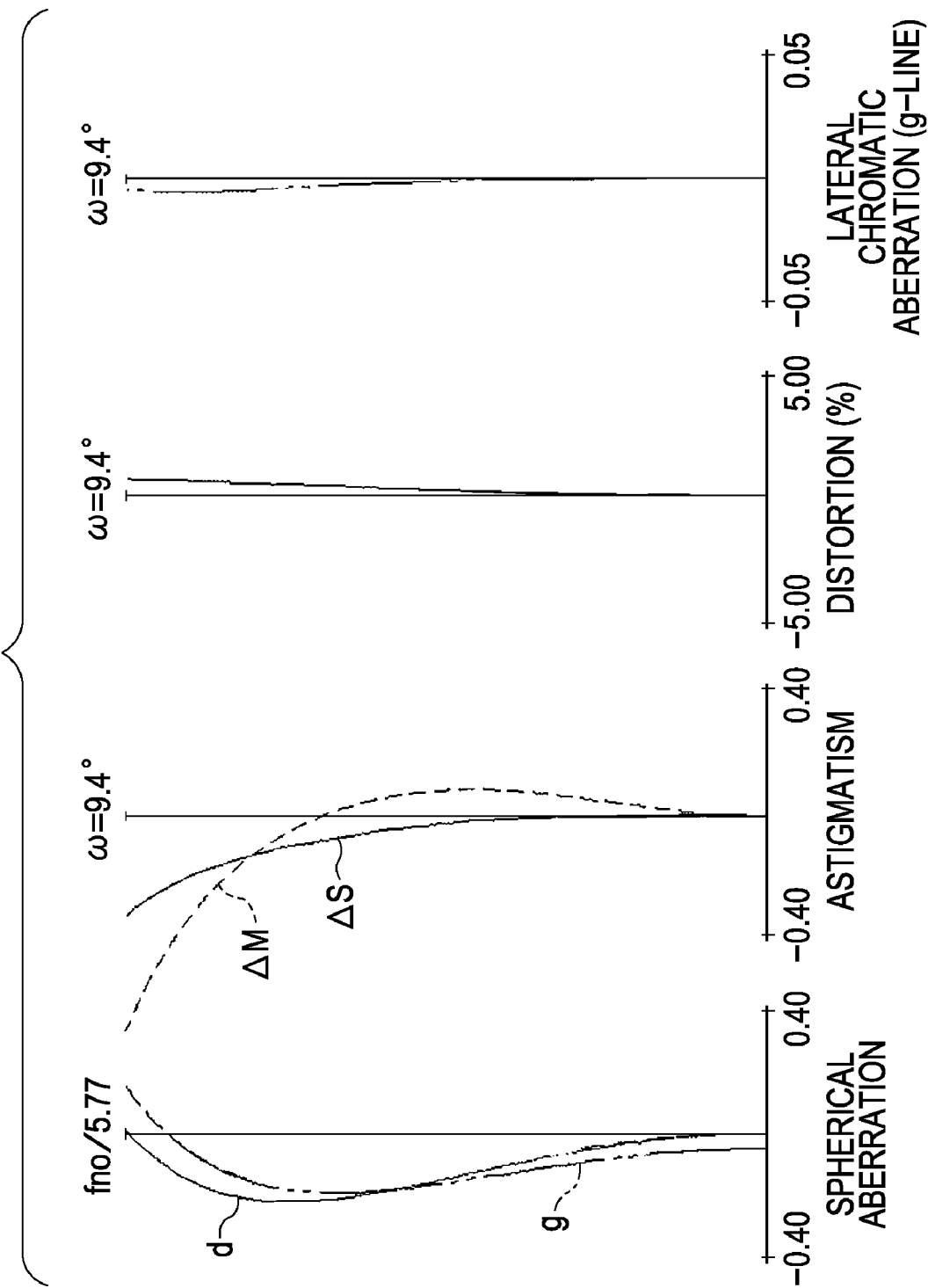
FIG. 12 illustrates aberration diagrams at a telephoto end according to the third embodiment.

FIG. 9 is a sectional view of a zoom lens according to a third embodiment of the present invention at a wide-angle end. FIGS. 10, 11, and 12 are aberration diagrams of the zoom lens according to the third embodiment at the wide-angle end, a middle zoom position, and a telephoto end, respectively.

Figure 13:
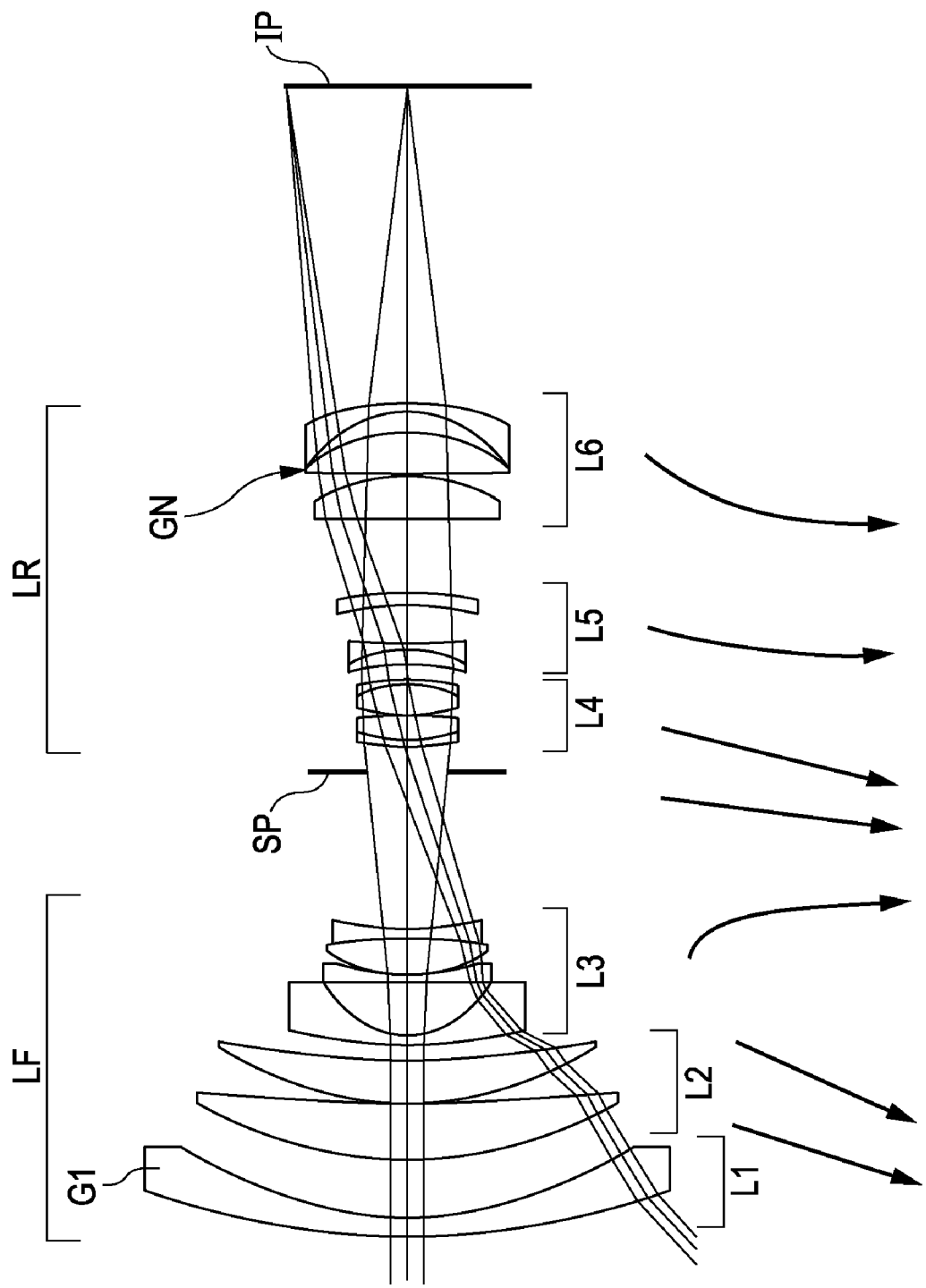
FIG. 13 is a sectional view of a lens according to a fourth embodiment.
Figure 14:
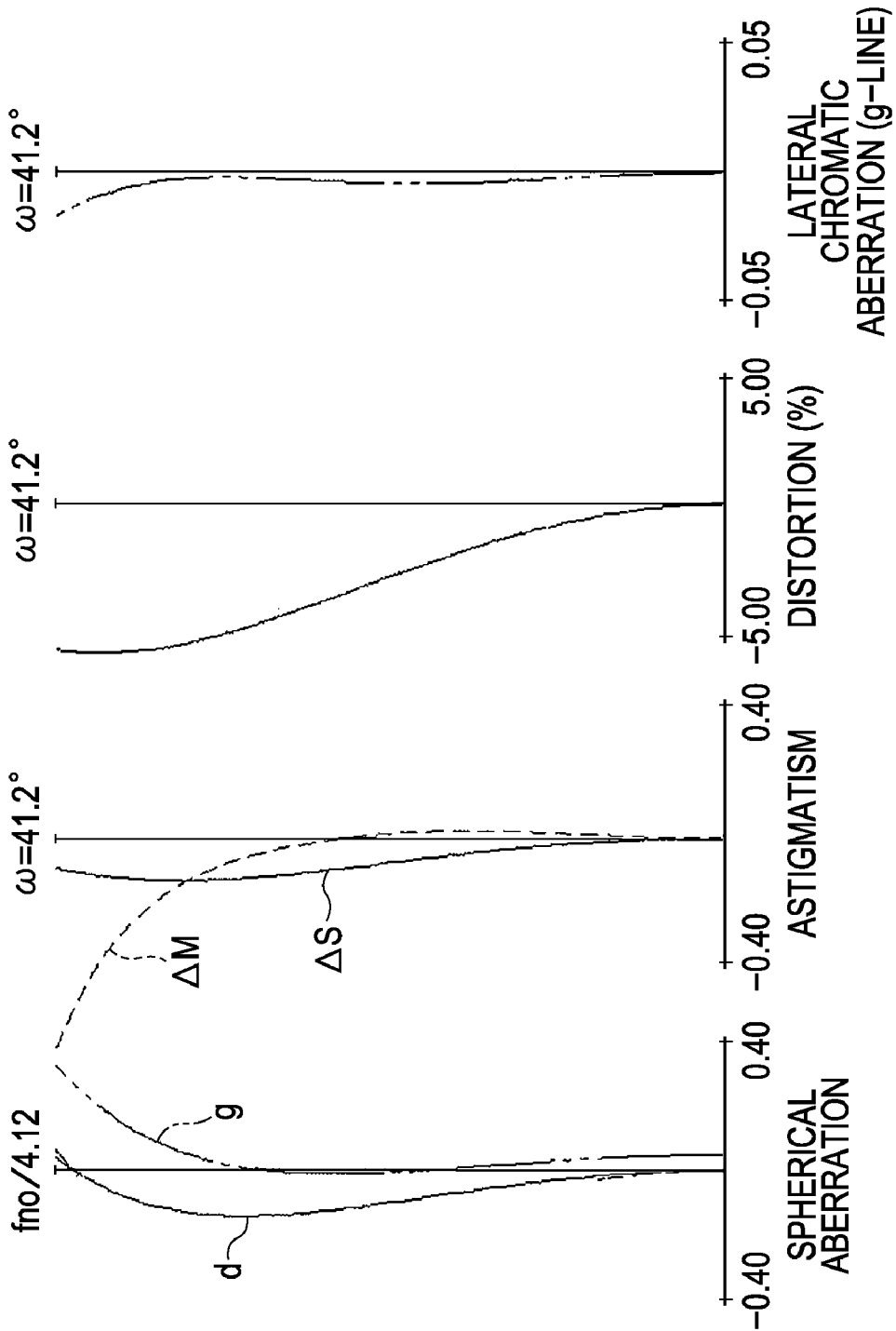
FIG. 14 illustrates aberration diagrams at a wide-angle end according to the fourth embodiment.
Figure 15:
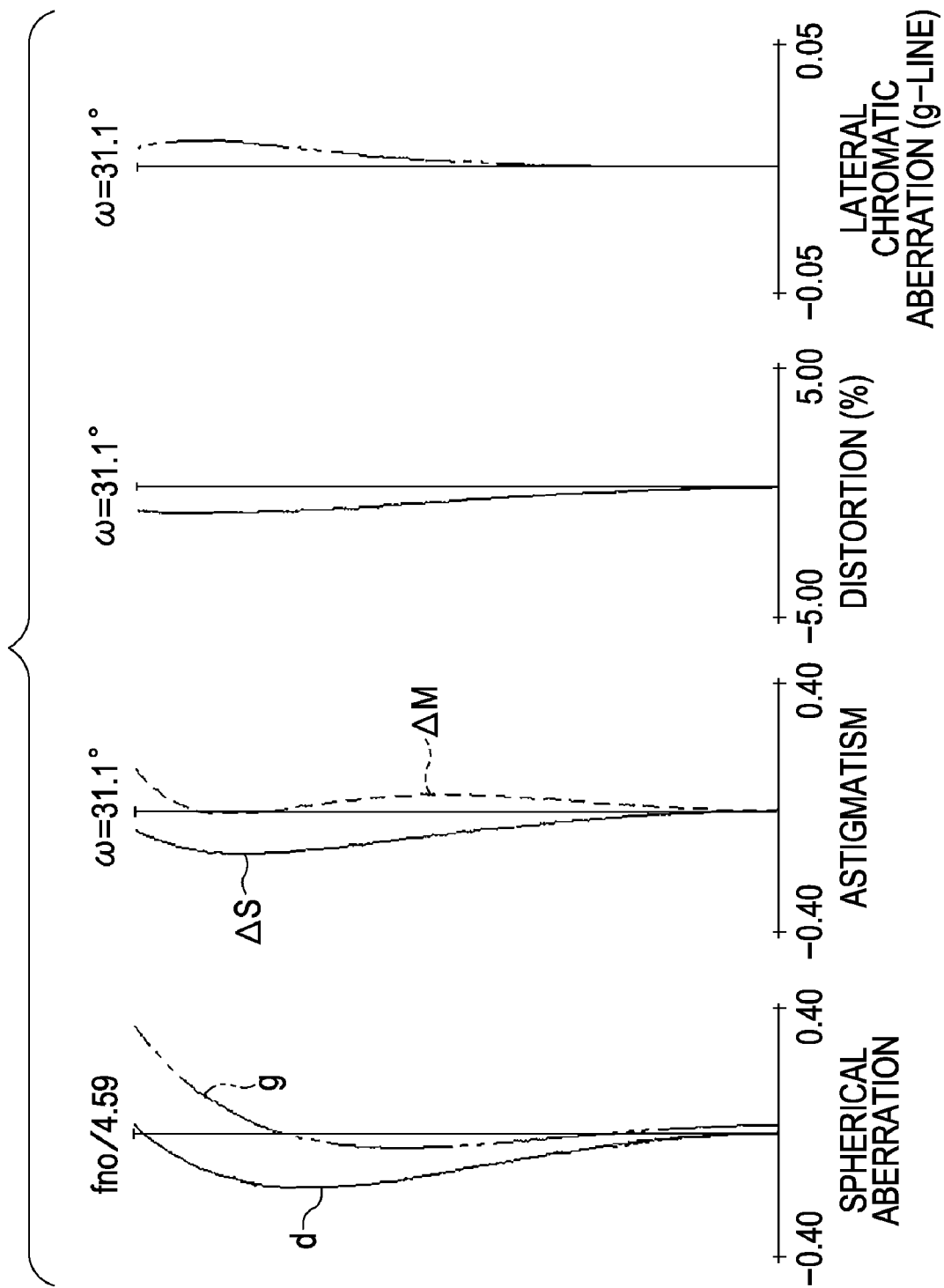
FIG. 15 illustrates aberration diagrams at a middle focal-length position according to the fourth embodiment.
Figure 16:
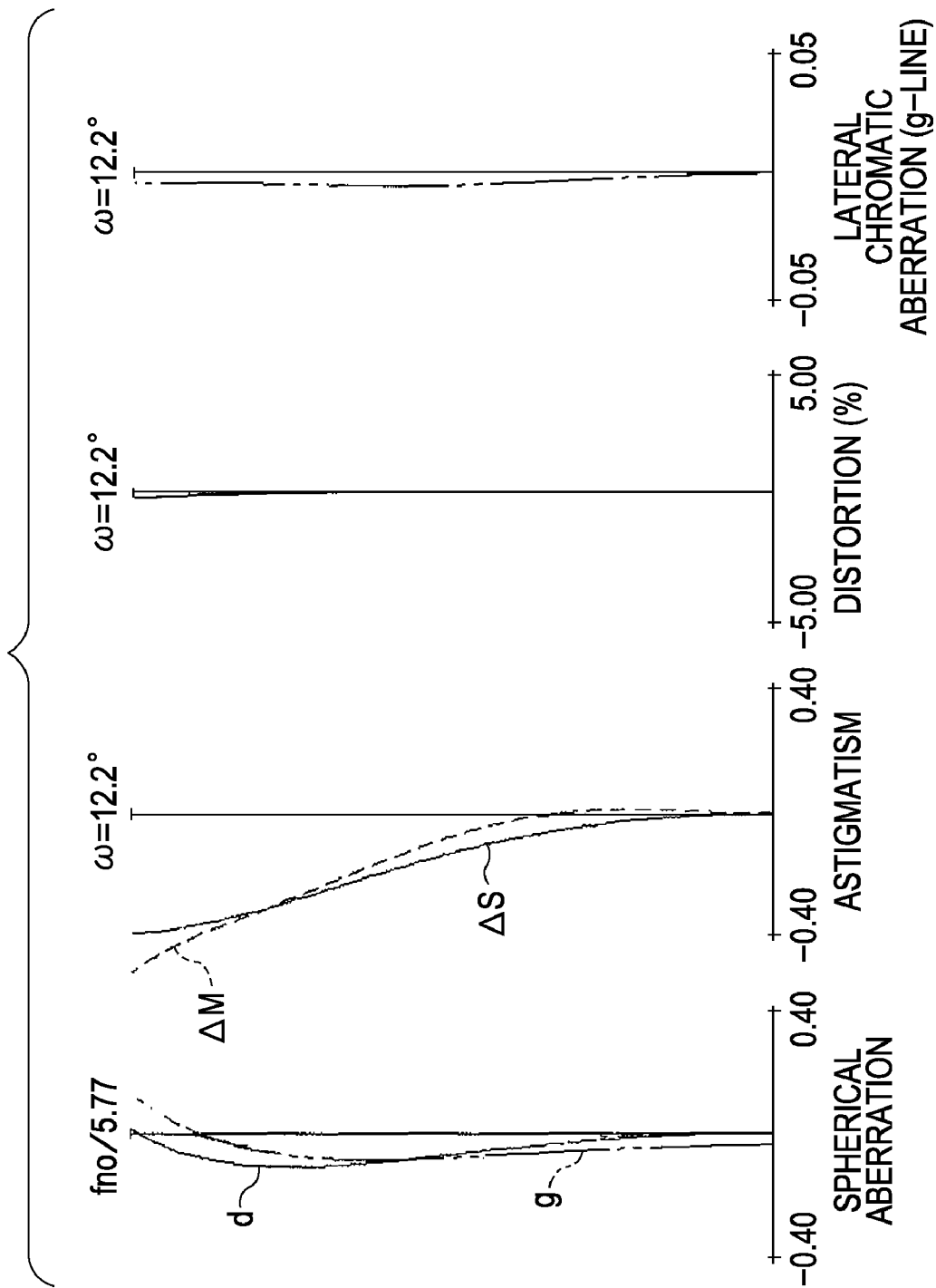
FIG. 16 illustrates aberration diagrams at a telephoto end according to the fourth embodiment.

FIG. 13 is a sectional view of a zoom lens according to a fourth embodiment of the present invention at a wide-angle end. FIGS. 14, 15, and 16 are aberration diagrams of the zoom lens according to the fourth embodiment at the wide-angle end, a middle zoom position, and a telephoto end, respectively.

Figure 22:
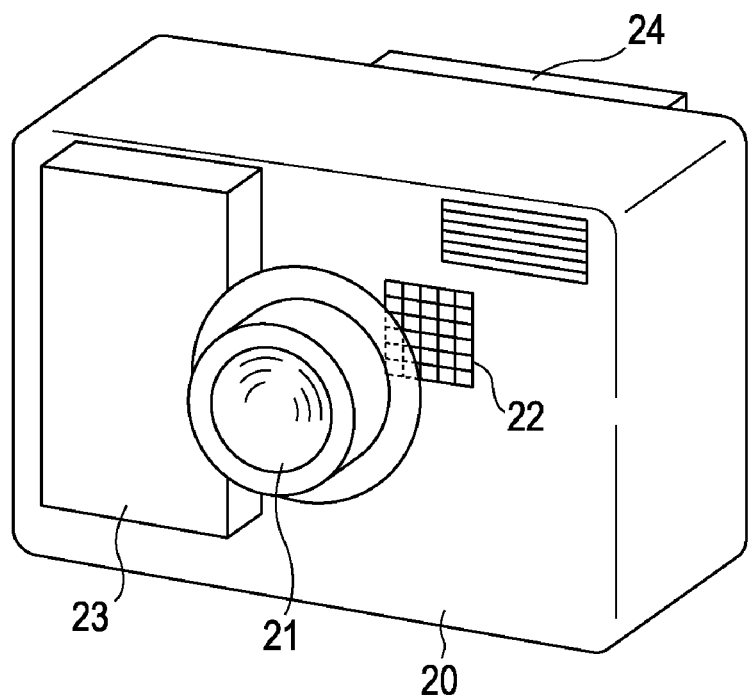
FIG. 22 is a schematic diagram of a digital camera including a zoom lens according to an embodiment of a present invention.

FIG. 22 is a schematic diagram illustrating the main part of an image pickup apparatus according to the present invention.

A zoom lens according to the present invention can be used in image pickup apparatuses such as a digital camera, a video camera, and a silver-halide film camera, observation apparatuses such as a telescope and binoculars, or optical apparatuses such as copy machines and projectors.

In the sectional views of lenses shown in FIGS. 1, 5, 9, and 13, the left side shows the front (object side, magnifying side) and the right side shows the rear (image side, reducing side).

An aperture stop SP is used for adjusting the amount of light.

A front lens unit LF is positioned closer to the object side than the aperture stop SP is, and includes a plurality of lens units.

A rear lens unit LR is positioned closer to the image side than the aperture stop SP is, and includes a plurality of lens units.

Here, i indicates the number counted from the object side, and Li indicates $i^{th}$ lens unit.

IP denotes an image plane. When the zoom lens is used as a photographing optical system of a video camera or a digital still camera, a photosensitive surface corresponding to an image pickup plane of a solid-state image pickup element (photoelectric conversion element), such as a CCD sensor and a CMOS sensor, is placed on the image plane IP.

G denotes a glass block, such as a filter, a faceplate, etc.

The arrows show loci of the lens units during zooming from the wide-angle end to the telephoto end.

In the aberration diagrams, d and g denote d-line and g-line, respectively, and ΔM and ΔS denote a meridional image plane and a sagittal image plane, respectively. The chromatic aberration of magnification is shown by g-line.

In addition, fno is the F-number and ω is the half angle of view.

In each embodiment, the wide-angle end and the telephoto end are zoom positions corresponding to the states in which a magnification-varying lens unit is at one and the other ends of a mechanically moveable range along an optical axis.

In each embodiment, the zoom lens consists of or includes the front lens unit LF on the object side of the aperture stop SP and the rear lens unit LR on the image side of the aperture stop SP. Each of the front lens unit LF and the rear lens unit LR consists of a plurality of lens units. Zooming is performed by moving the plurality of lens units.

The front lens unit LF includes at least one diffractive optical part having a positive power. The rear lens unit LR includes at least one refractive optical element GN made of a solid material and having a positive refractive power.

In the first and second embodiments shown in FIGS. 1 and 5, respectively, the front lens unit LF includes a first lens unit L1 having a positive refractive power and a second lens unit L2 having a negative refractive power in order from the object side to the image side. The rear lens unit LR includes a third lens unit L3 having a positive refractive power and a fourth lens unit L4 having a positive refractive power in order from the object side to the image side.

In the third embodiment shown in FIG. 9, the front lens unit LF includes a first lens unit L1 having a positive refractive power and a second lens unit L2 having a negative refractive power in order from the object side to the image side. The rear lens unit LR includes a third lens unit L3 having a positive refractive power, a fourth lens unit L4 having a positive refractive power, and a fifth lens unit L5 having a positive refractive power in order from the object side to the image side.

In the fourth embodiment shown in FIG. 13, the front lens unit LF includes a first lens unit L1 having a negative refractive power, a second lens unit L2 having a positive refractive power, and a third lens unit L3 having a negative refractive power. The rear lens unit LR includes a fourth lens unit L4 having a positive refractive power, a fifth lens unit L5 having a negative refractive power, and a sixth lens unit L6 having a positive refractive power.

The Abbe number and the partial dispersion ratio of the material forming the refractive optical element GN are expressed as $vd$ and $\theta gF$, respectively.

The focal lengths of the diffractive optical part and the refractive optical element GN in the air are expressed as fD and fN, respectively. Here, the following expressions are satisfied:

$$0.755 < \theta gF - (-1.665 \times 10^{-7} \cdot vd^3 + 5.213 \times 10^{-5} \cdot vd^2 - 5.656 \times 10^{-3} \cdot vd) < 1.011 \quad (1)$$

$$80 < fD/fN < 800 \quad (2)$$

The Abbe number and the partial dispersion ratio of the optical component used in the zoom lens of each embodiment will be described below.

When the refractive indices at the g-line (wavelength 435.8 nm), the F-line (486.1 nm), the d-line (587.6 nm), and the C-line (656.3 nm), which are Fraunhofer lines, are $N_g$, $N_F$, $N_d$, and $N_C$, respectively, the Abbe number $vd$ and the partial dispersion ratio $\theta gF$ are defined similarly to common definitions as follows:

$$vd = (N_d - 1)/(N_F - N_C)$$

$$\theta gF = (N_g - N_F)/(N_F - N_C)$$

The refractive optical element is, for example, a refractive lens or layer that generates power by refraction, and does not include a diffractive optical element that generates power by diffraction.

Here, the solid material is a material that is in the solid state when the zoom lens is used; the state of the material in the manufacturing process or the like before use in the optical system is not limited. For example, a material that is in the liquid state during the manufacturing process and is then cured into a solid material can also be used as the solid material according to the embodiments of the present invention.

The power (reciprocal of focal length) $\phi D$ of the diffractive optical part is obtained as described below.

With regard to the shape of a diffraction grating that functions as the diffractive optical part, the reference wavelength (d-line) is expressed as $\lambda D$, the distance from an optical axis is expressed as h, phase coefficients are expressed as C2, C4, C6, . . . , and C2·i, and the phase is expressed as $\phi(h)$.

The phase $\phi(h)$ is defined as follows:

$$\phi(h) = (2\pi/\lambda d) \cdot (C2 \times h^2 + C4 \times h^4 + \ldots C2i \times h^{2i})$$

The refractive power $\phi D$ can be expressed using the coefficient C2 of the quadratic term as follows:

$$\phi D = -2 \cdot C2$$

The diffractive optical part has high anomalous dispersion characteristics. Therefore, when the diffractive optical part is included in the first lens unit L1, the axial chromatic aberration and the chromatic aberration of magnification at the telephoto side can be effectively corrected.

When the diffractive optical part having high anomalous dispersion characteristics is disposed in the first lens unit L1, the chromatic aberration of magnification at the wide-angle end is increased.

Therefore, the refractive optical element GN made of a material having high anomalous dispersion characteristics is placed in the fourth lens unit L4 disposed near the image plane. Accordingly, the secondary spectrum of the chromatic aberration of magnification at the wide-angle end can be adequately corrected. When the refractive optical element GN has a positive refractive power, the anomalous dispersion characteristics of the material of the refractive optical element GN are such that the partial dispersion ratio for a certain Abbe number is higher than that of a normal glass material, that is, such that nonlinearity of the refractive index relative to the wavelength is increased.

If the value of Conditional Expression (1) is less than the lower limit, the refractive optical element GN cannot provide sufficient anomalous dispersion effect. Therefore, the chromatic aberration of magnification at the wide-angle end cannot be effectively corrected. If the value of Conditional Expression (1) is more than the upper limit, it becomes difficult to correct the chromatic aberration of magnification at the telephoto end.

Conditional Expression (2) is provided for adequately setting the relationship between the refractive power of the diffractive optical part included in the front lens unit LF and the refractive power of the refractive optical element GN included in the rear lens unit LR for providing the anomalous dispersion effect.

If the refractive power of the refractive optical element GN is reduced or the refractive power of the diffractive optical part is increased such that the value of Conditional Expression (2) is reduced to below the lower limit, it becomes difficult to correct the chromatic aberration of magnification at the wide-angle end. If the refractive power of the refractive optical element GN is increased such that the value of Conditional Expression (2) is increased beyond the upper limit, it becomes difficult to correct the chromatic aberration of magnification at the telephoto end.

An example of a solid optical material that satisfies Conditional Expression (1) is resin. In particular, resin materials listed below can be used as the optical materials that satisfy Conditional Expression (1). However, the present invention is not limited to the materials given below.

UV curing resin (nd=1.635, vd=22.7, $\theta gF$=0.69)

N-polyvinyl carbazole (nd=1.696, vd=17.7, $\theta gF$=0.69)

In addition, mixtures obtained by dispersing fine particles of the following inorganic oxides into synthetic resin may be used as materials having optical characteristics different from those of normal glass materials.

$TiO_2$ (nd=2.304, vd=13.8)

$Nb_2O_5$ (nd=2.367, vd=14.0)

ITO (nd=1.8581, vd=5.53)

$Cr_2O_3$ (nd=2.2178, vd=13.4)

$BaTiO_3$ (nd=2.4362, vd=11.3)

For example, an optical material that satisfies Conditional Expression (1) can be obtained by dispersing fine particles of $TiO_2$ (nd=2.304, vd=13.8, $\theta gF$=0.87) into synthetic resin. $TiO_2$ is a material used for various applications, and is used as, for example, a deposition material for forming an optical film, such as an antireflection film, in the field of optics. $TiO_2$ is also used as photocatalyst, white pigment, etc., and fine particles thereof are used as a cosmetic material.

The average diameter of the $TiO_2$ fine particles can be set to about 2 nm to 50 nm when the influence of scattering is taken into account, and dispersant or the like may be used to prevent aggregation.

Polymer can be used as the medium into which the $TiO_2$ particles are dispersed, and high mass productivity can be provided by photopolymerization forming or thermal polymerization forming using a forming die.

In addition, with regard to the characteristics of optical constant, a polymer having a relatively high partial dispersion ratio, a polymer having a relatively low Abbe number, or a polymer having both a relatively high partial dispersion ratio and a relatively low Abbe number can be used. For example, N-polyvinylcarbazole, styrene, polymethylmethacrylate (acryl), etc., can be used. In the embodiments described below, UV-curable resin and N-polyvinylcarbazole are used as host polymer into which the $TiO_2$ fine particles are dispersed. However, the present invention is not limited to this.

Next, the structure of the diffractive optical element used in each embodiment will be described.

Figure 17:
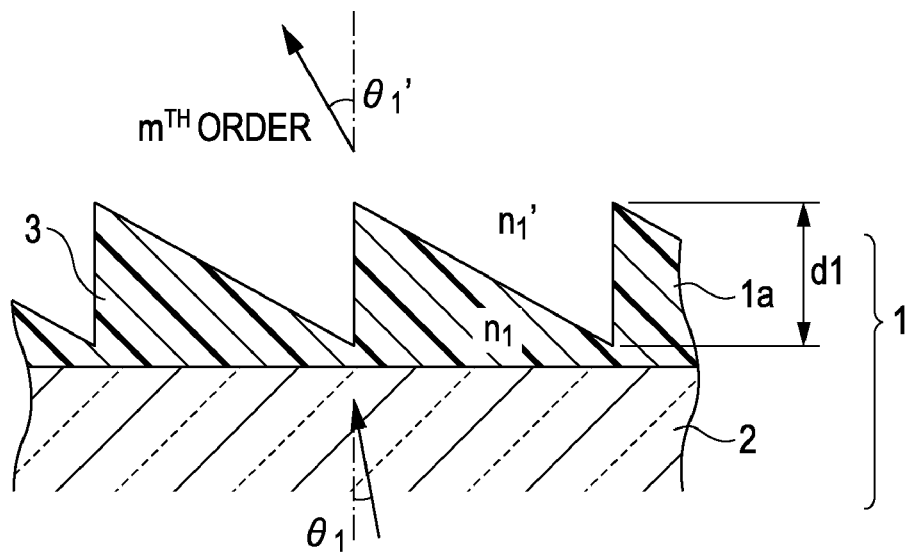
FIG. 17 is a sectional view of a diffractive optical part having a single layer structure.

FIG. 17 is an enlarged sectional view illustrating a part of a diffractive optical part 1a included in a diffractive optical element 1. The diffractive optical part 1a shown in FIG. 17 includes a diffraction grating 3 having a single-layer structure and provided on a substrate (lens, transparent substrate, etc.) 2.

Figure 18:
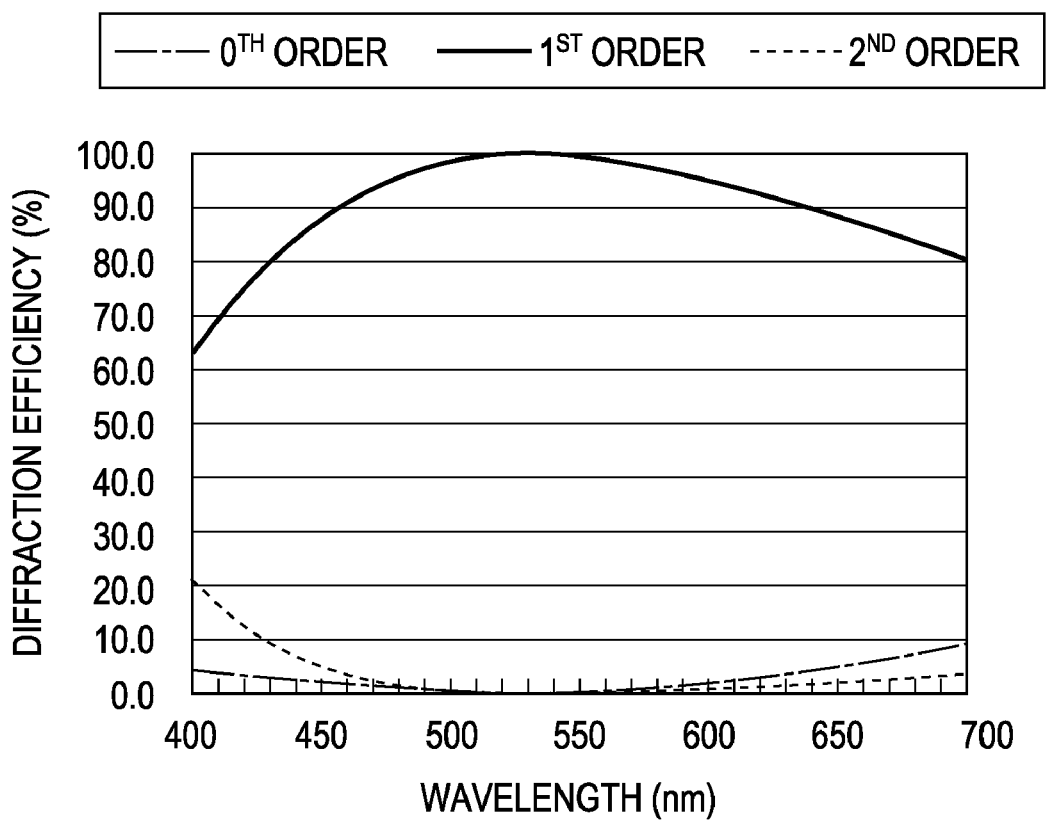
FIG. 18 is a graph of diffraction efficiency of the diffractive optical part having the single layer structure.

FIG. 18 is a diagram illustrating the diffraction efficiency characteristics of the diffractive optical part 1a. In FIG. 18, the horizontal axis shows the wavelength and the vertical axis shows the diffraction efficiency.

The diffraction efficiency is the ratio of the amount of diffracted light to the overall transmitted light. Light reflected at the boundary surfaces of the grating is not considered here.

Ultraviolet curing resin (refractive index nd=1.513, Abbe number νd=51.0) is used as the optical material of the diffraction grating 3. The grating thickness d1 is set to 1.03 μm. The diffraction efficiency for the +1st order diffracted light with a wavelength of 530 nm is at a maximum. In other words, the design order is +1st order and the design wavelength is 530 nm. In FIG. 18, the diffraction efficiency for the +1st order diffracted light is shown by the solid line.

FIG. 18 also shows the diffraction efficiency for orders around the design order (that is, the 0th and +2nd orders, which are +1 order relative to the +1st order). As is clear from FIG. 18, the diffraction efficiency for the design order is increased to a maximum at the design wavelength, and is gradually reduced as the difference from the design wavelength is increased.

The reduction in the diffraction efficiency for the design order generates the diffracted light of the other orders, which leads to an occurrence of flare. In the case in which the diffractive optical part 1 is used at a plurality of positions in the optical system, the reduction in the diffraction efficiency at wavelengths other than the design wavelength leads to a reduction in transmittance.

Figure 19:
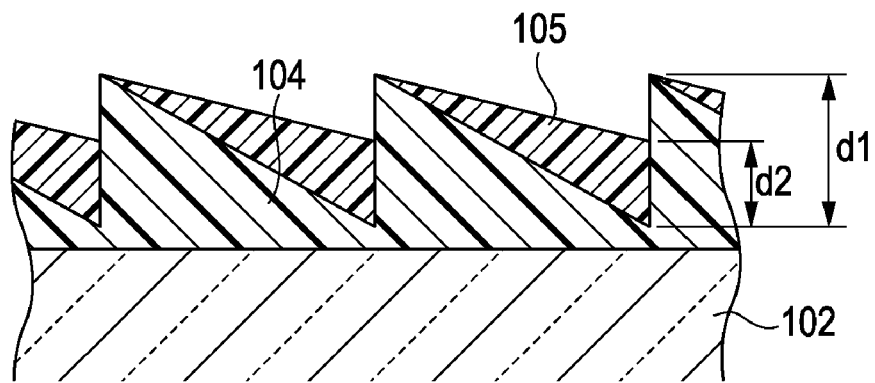
FIG. 19 is a sectional view of a diffractive optical part having a multilayer structure.
Figure 20:
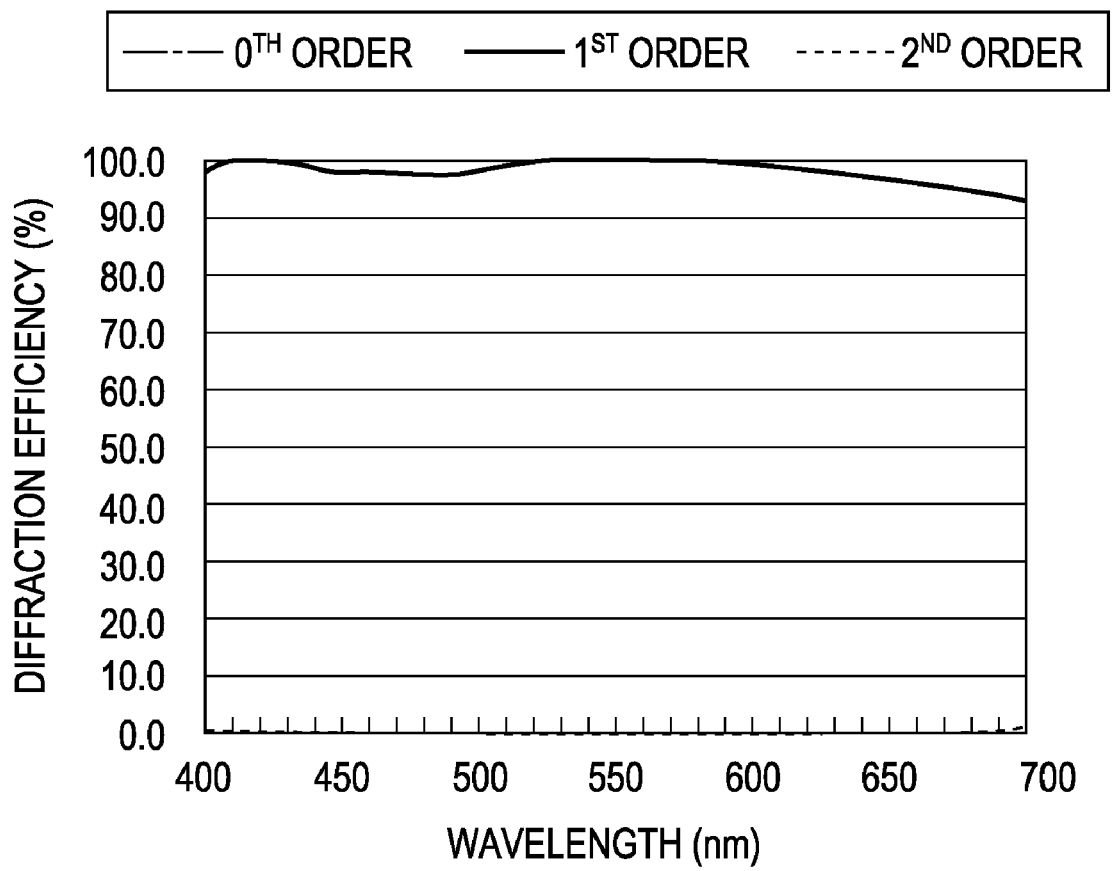
FIG. 20 is a graph of diffraction efficiency of the diffractive optical part having the multilayer structure.

In each embodiment, a diffractive optical part having a multilayer structure including a plurality of diffraction gratings made of different materials may also be used. FIG. 19 is an enlarged sectional view illustrating a part of a diffractive optical part including a diffraction grating formed in a multilayer structure. FIG. 20 is a diagram illustrating the wavelength dependency of the diffraction efficiency of the diffraction gratings shown in FIG. 19 for the +1st order diffracted light. The diffractive optical part shown in FIG. 19 includes a first diffraction grating 104 made of ultraviolet curing resin and formed on a substrate 102 and a second diffraction grating 105 provided on the first diffraction grating 104.

The refractive index nd and Abbe number νd of the ultraviolet curing resin are 1.499 and 54, respectively.

The refractive index nd and Abbe number νd of the material of the second diffraction grating 105 are 1.598 and 28, respectively.

In the combination of the above-mentioned materials, the grating thickness d1 of the first diffraction grating 104 is set to d1=13.8 μm and the grating thickness d2 of the second diffraction grating 105 is set to d2=10.5 μm.

As is clear from FIG. 20, when the diffractive optical part including the diffraction gratings formed in the multilayer structure is used, a high diffraction efficiency, such as 95% or more, is obtained for the design-order diffracted light over the entire wavelength range to be used (visible range in this example).

The material of the diffraction gratings included in the diffractive optical part having the multilayer structure is not limited to ultraviolet curing resins, and other plastic materials can be used as an alternative. In addition, depending on the base material, the first layer can also be formed directly in the base material.

Figure 21:
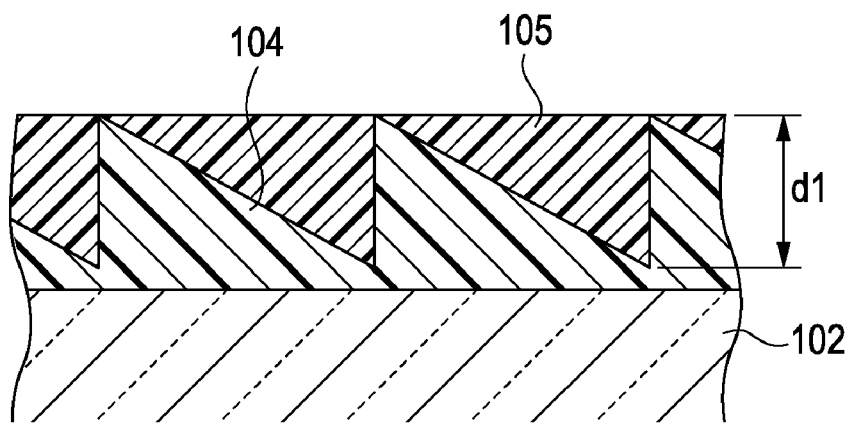
FIG. 21 is a sectional view of a diffractive optical part.

It is not necessary that the diffraction gratings have different grating thicknesses. For example, as shown in FIG. 21, the two layers 104 and 105 can have the same grating thickness depending on the materials thereof. In such a case, the grating structure does not have a ridged surface. Therefore, high dust resistance is obtained and the diffractive optical element can be assembled with high work efficiency. In addition, it is not necessary that the two diffraction gratings 104 and 105 be in close contact with each other. The two diffraction gratings may also be disposed with an air layer provided therebetween.

Next, conditions of the zoom lens according to the embodiments of the present invention will be described.

To adequately correct the chromatic aberration of magnification at the wide-angle end, the following condition can be satisfied:

$$3.0 < fN/fw < 12.0 \quad (3)$$

where fw is the focal length of the overall system at the wide-angle end.

If the value of Conditional Expression (3) is less than the lower limit, the chromatic aberration of magnification is increased at the telephoto end. In addition, the thickness of the refractive optical element GN must be increased and it becomes difficult to form the refractive optical element GN with the resin layer. If the value of Conditional Expression (3) is more than the upper limit, the chromatic aberration of magnification cannot be sufficiently corrected at the wide-angle end.

In each embodiment, if the refractive optical element GN is formed of a resin material, the fourth lens unit L4 can include at least one positive lens and at least one negative lens and the refractive optical element GN can be placed between the positive lens and the negative lens. Such a structure can enable the lens profile tolerances to be relaxed such that lenses with larger surface inhomogeneities can be used, and is advantageous in view of resistance to harsh environments.

To adequately correct the chromatic aberrations at the telephoto side, the following condition can be satisfied:

$$50 < fD/fP < 1000 \quad (4)$$

where fP is the focal length of the positive lens nearest to the object side.

If the power of the diffractive optical part is increased such that the value of Conditional Expression (4) is reduced to below the lower limit, the secondary spectrum of the axial chromatic aberration is excessively corrected at the telephoto end. If the power of the diffractive optical part is reduced such that the value of Conditional Expression (4) is increased to above the upper limit, the axial chromatic aberration and the chromatic aberration of magnification cannot be sufficiently corrected at the telephoto end.

In each embodiment, a zoom lens having a high optical performance can be obtained by satisfying Conditional Expressions (1) to (4). However, to further increase the optical performance, the numerical ranges can be set as follows:

$$0.76 < \theta gF - (-1.665 \times 10^{-7} \cdot vd^3 + 5.213 \times 10^{-5} \cdot vd^2 - 5.656 \times 10^{-3} \cdot vd) < 0.85 \quad (1a)$$

$$120 < fD/fN < 600 \quad (2a)$$

$$4.0 < fN/fw < 10.0 \quad (3a)$$

$$90 < fD/fP < 800 \quad (4a)$$

Detailed structure of each embodiment will now be described.

First Embodiment

In the zoom lens according to the first embodiment shown in FIG. 1, the first lens unit L1 has a positive refractive power, the second lens unit L2 has a negative refractive power, the third lens unit L3 has a positive refractive power, and the fourth lens unit L4 has a positive refractive power.

The aperture stop SP is positioned in front of (on the object side of) the third lens unit L3 and moves along the optical axis during zooming. In FIG. 1, the arrows show loci along which the lens units move during zooming from the wide-angle end to the telephoto end.

In the first embodiment, a rear-focusing method is used in which focusing is performed by moving the fourth lens unit L4 along the optical axis.

In FIG. 1, a solid curve 4a and a dotted curve 4b show loci along which the fourth lens unit L4 moves to correct image-plane variation during zooming from the wide-angle end to the telephoto end when an object at infinity and a close-distance object, respectively, are in focus.

In the first embodiment, as shown by the curves 4a and 4b, the fourth lens unit L4 moves along loci that are convex toward the object side during zooming from the wide-angle end to the telephoto end. Thus, the space between the third lens unit L3 and the fourth lens unit L4 is effectively used and the total lens length is effectively reduced.

The fourth lens unit L4 used for focusing has a relatively small effective diameter. Therefore, load on the actuator can be reduced and the focusing speed is increased. During focusing from an object at infinity to a close-distance object at the telephoto end, the fourth lens unit L4 is moved forward as shown by an arrow 4c.

During zooming from the wide-angle end to the telephoto end, the first lens unit L1 is moved such that the position thereof at the telephoto end is closer to the object side than that at the wide-angle end. The second lens unit L2 is moved such that the position thereof at the telephoto end is closer to the image plane than that at the wide-angle end. The third lens unit L3 is moved such that the position thereof at the telephoto end is closer to the object side than that at the wide-angle end.

In the first embodiment, the third lens unit L3 is moved along a locus that is convex toward the object side. This suppresses the front lens diameter from being increased for obtaining sufficient marginal rays at a middle zoom position. As a result, the front lens diameter can be reduced.

In the following descriptions, it is assumed that the lens units are arranged in the mentioned order from the object side to the image side, unless stated otherwise. The first lens unit L1 has the following structure. That is, a cemented lens including a first lens G1 and a second lens G2 is disposed nearest to the object side. The first lens G1 is a meniscus lens having a convex surface facing the object side, and has a negative refractive power. The second lens G2 has a positive refractive power.

The first lens unit L1 also includes a third lens G3 and a fourth lens G4. The third lens G3 is a meniscus lens having a convex surface facing the object side and has a positive refractive power. The absolute value of the refractive power of the third lens G3 at the object side is higher than that at the image side. The fourth lens G4 is a meniscus lens having a convex surface facing the object side and has a positive refractive power. The absolute value of the refractive power of the fourth lens G4 at the object side is higher than that at the image side.

A diffractive optical part that is rotationally symmetrical about the optical axis and that includes a diffraction grating with a positive power is provided on the cemented surface between the first lens G1 having a negative refractive power and the second lens G2 having a positive refractive power. The diffractive optical part and the cemented lens form a diffractive optical element.

The angle of light rays incident on the diffractive optical part (diffractive optical surface) based on the angle of view is set within a desired range by setting the curvature of the cemented surface on which the diffractive optical part is provided. Therefore, high diffraction efficiency can be provided over the entire zoom area and all angle of views.

Second Embodiment

Next, the zoom lens according to the second embodiment shown in FIG. 5 will be described. The zoom type of the zoom lens according to the second embodiment is the same as that of the zoom lens according to the first embodiment. In the second embodiment, the first lens unit L1 includes a first lens G1 having a negative refractive power, a second lens G2 having a positive refractive power, and a third lens G3 having a positive refractive power, in order from the object side to the image side.

A diffractive optical part having a positive refractive power is provided on the cemented surface between the first lens G1 and the second lens G2.

In the second embodiment, the chromatic aberrations are effectively corrected by the diffractive optical part, so that the chromatic aberrations generated at the first lens unit L1 can be reduced. In addition, the third lens G3 is formed of a material with a high refractive index so as to achieve both the correction of aberrations and size reduction.

The fourth lens unit L4 includes a refractive optical element GN having anomalous dispersion characteristics and including a layer with a positive refractive power. Therefore, the chromatic aberration of magnification can be accurately corrected at the wide-angle end.

Other structures of the second embodiment are similar to those of the first embodiment.

Third Embodiment

Next, the zoom lens according to the third embodiment will be described with reference to FIG. 9.

In the zoom lens according to the third embodiment shown in FIG. 9, the first lens unit L1 has a positive refractive power, the second lens unit L2 has a negative refractive power, the third lens unit L3 has a positive refractive power, the fourth lens unit L4 has a negative refractive power, and the fifth lens unit L5 has a positive refractive power.

The aperture stop SP is positioned in front of the third lens unit L3 and moves along the optical axis during zooming. During zooming, the aperture stop SP can move independently of the third lens unit L3. Alternatively, the aperture stop SP can move together with the third lens unit L3.

During zooming from the wide-angle end to the telephoto end, the first lens unit L1, the third lens unit L3, the fourth lens unit L4, and the fifth lens unit L5 move toward the object side. The second lens unit L2 moves nonlinearly.

The moving loci and refractive powers of the lens units are set so that the photographing angle of view is 75° or more at the wide-angle end and the size of the overall lens system is reduced wile maintaining a zoom ratio at around 5×. Focusing is performed by moving the second lens unit L2 along the optical axis.

In the third embodiment, the first lens unit L1 includes a first lens G1 having a negative refractive power, a second lens G2 having a positive refractive power, and a third lens G3 having a positive refractive power, in order from the object side to the image side. A diffractive optical part is provided on a cemented surface between the first lens G1 and the second lens G2.

The diffractive optical part adequately corrects the axial chromatic aberration and the chromatic aberration of magnification at the telephoto end. The fifth lens unit L5 includes a refractive optical element GN having high anomalous dispersion characteristics and a positive refractive power. Therefore, the chromatic aberration of magnification is effectively corrected at the wide-angle end.

In the third embodiment, during zooming from the wide-angle end to the telephoto end, the first lens unit including the diffractive optical part is largely moved toward the object side. Accordingly, the height of off-axis light rays is reduced at the wide-angle end and is increased at the telephoto end.

Therefore, the chromatic aberration of magnification can be effectively corrected at the telephoto end while suppressing the influence at the wide-angle end. In addition, the fifth lens unit L5 is moved such that the height of off-axis light rays of the fifth lens unit L5 including the refractive optical element GN is increased at the wide-angle end and is reduced at the telephoto end. Accordingly, the influence of the refractive optical element GN to the chromatic aberrations is increased at the wide-angle end and is reduced at the telephoto end.

To suppress variation in astigmatism during zooming, the fifth lens unit can include at least two positive lenses and one negative lens. The refractive optical element GN can be disposed between one of the positive lenses and the negative lens.

Fourth Embodiment

Next, the zoom lens according to the fourth embodiment will be described with reference to FIG. 13.

In the zoom lens according to the fourth embodiment shown in FIG. 13, the first lens unit L1 has a negative refractive power, the second lens unit L2 has a positive refractive power, the third lens unit L3 has a negative refractive power, the fourth lens unit L4 has a positive refractive power, the fifth lens unit L5 has a negative refractive power, and the sixth lens unit L6 has a positive refractive power.

The aperture stop SP is positioned in front of the fourth lens unit L4 and moves along the optical axis during zooming.

During zooming, the aperture stop SP can move independently of the fourth lens unit L4. Alternatively, the aperture stop SP can move together with the fourth lens unit L4. During zooming from the wide-angle end to the telephoto end, the first lens unit L1, the second lens unit L2, the fourth lens unit L4, the fifth lens unit L5, and the sixth lens unit L6 move toward the object side. The third lens unit L3 moves nonlinearly.

The moving loci and refractive powers of the lens units are set so that the photographing angle of view is 80° or more at the wide-angle end and the size of the overall lens system is reduced wile maintaining a zoom ratio of 4× or more. Focusing is performed by moving the third lens unit L3 along the optical axis.

In the fourth embodiment, the first lens unit L1 having a negative refractive power and the second lens unit L2 having a positive refractive power correspond to the first lens unit L1 according to the third embodiment. The first lens unit L1 and the second lens unit L2 move individually during zooming so that variation in distortion during zooming caused by the increase in the angle of view and the spherical aberration at the telephoto end are adequately corrected.

In addition, a diffractive optical part is provided on the image plane side of the first lens unit G1 in the first lens unit L1. Accordingly, the chromatic aberration of magnification is effectively corrected at the telephoto end. In addition, the sixth lens unit L6 includes a refractive optical element GN having anomalous dispersion characteristics and a positive refractive power. Therefore, the chromatic aberration of magnification is effectively corrected at the wide-angle end.

In each embodiment, motion blurring (image blurring) can be corrected by moving the entire body of the third lens unit L3 or a part of the third lens unit L3 in a direction perpendicular to the optical axis.

In each embodiment, an optical filter or a lens unit having a small refractive power can be added on the object side of the first lens unit L1 or on the image side of the rearmost lens unit.

In addition, a teleconverter lens, a wide converter lens, etc., can also be arranged on the object side or the image side.

According to the present invention, as described above, a diffractive optical part is provided in a front lens unit disposed on the object side of the zoom lens and a refractive optical element having anomalous dispersion characteristics is provided in a rear lens unit on the image side. Therefore, a zoom lens with high optical performance that can adequately correct chromatic aberrations over the entire zoom area is obtained.

Numerical examples of the present invention will be described next. In each numerical example, i indicates the surface number counted from the object side and Ri indicates the radius of curvature of the $i^{th}$ lens surface counted from the object side. Di indicates the lens thickness and air gap for the $i^{th}$ lens surface counted from the object side. Ni and vi indicate the refractive index and the Abbe number, respectively, of glass of the $i^{th}$ lens counted from the object side.

When an X axis that extends in the optical axis direction and a H axis that is perpendicular to the optical axis are defined, the direction in which light travels is defined to be positive, R is the paraxial radius of curvature, and K, A, B, C, D, and E are the aspherical coefficients, the shape of the aspherical surface is expressed as follows:

$$X = \frac{(1/R)H^2}{1+\sqrt{1-(1+K)(H/R)^2}} + BH^4 + CH^6 + DH^8 + EH^{10}$$

In addition, when the phase is φ(h), the shape of the diffractive optical part can be expressed as follows:

$$\phi(h) = 2\pi/\lambda \cdot (C2 \cdot h^2 + C4 \cdot h^4 + \ldots C2 \cdot i \cdot h^{2i})$$

where λ is the reference wavelength (d-line) and h is the distance from the optical axis.

Each of the numerical examples will now be described. The relationships between values of Conditional Expressions (1) to (4) are shown in Table 1.

First Numerical Example

| f = 6.10 to 117.00, Fno = 2.72 to 3.98, 2ω = 60.6° to 3.5° | | | | |
|---|---|---|---|---|
| R1 = 98.091 | D1 = 1.60 | N1 = 1.806100 | ν1 = 33.3 | |
| R2 = 41.343 | D2 = 4.80 | N2 = 1.487490 | ν2 = 70.2 | |
| (diffractive optical part) | | | | |
| R3 = −180.741 | D3 = 0.20 | | | |
| R4 = 33.778 | D4 = 4.10 | N3 = 1.487490 | ν3 = 70.2 | |
| R5 = 140.918 | D5 = 0.20 | | | |
| R6 = 40.293 | D6 = 2.00 | N4 = 1.487490 | ν4 = 70.2 | |
| R7 = 64.337 | D7 = variable | | | |
| R8 = 66.287 | D8 = 0.90 | N5 = 1.882997 | ν5 = 40.8 | |
| R9 = 8.276 | D9 = 4.35 | | | |
| R10 = −19.971 | D10 = 0.75 | N6 = 1.603112 | ν6 = 60.6 | |
| R11 = 33.185 | D11 = 0.20 | | | |
| R12 = 17.871 | D12 = 1.90 | N7 = 1.922860 | ν7 = 18.9 | |
| R13 = 84.088 | D13 = variable | | | |
| R14 = aperture | D14 = 8.75 | | | |
| R15 = 9.463 | D15 = 2.50 | N8 = 1.772499 | ν8 = 49.6 | |
| R16 = 72.943 | D16 = 1.85 | | | |
| R17 = 15.988 | D17 = 0.70 | N9 = 1.846660 | ν9 = 23.9 | |
| R18 = 7.237 | D18 = 0.98 | | | |
| R19 = 28.931 | D19 = 1.40 | N10 = 1.487490 | ν10 = 70.2 | |
| R20 = −335.950 | D20 = 1.80 | | | |
| R21 = ∞ | D21 = variable | | | |
| R22 = 16.713 | D22 = 2.50 | N11 = 1.496999 | ν11 = 81.5 | |
| R23 = −16.265 | D23 = 0.60 | N12 = 1.761821 | ν12 = 26.5 | θgF = 0.675 |
| R24 = −11.718 | D24 = 0.60 | N13 = 1.846660 | ν13 = 23.9 | |
| R25 = −25.617 | D25 = variable | | | |
| R26 = ∞ | D26 = 0.30 | N14 = 1.544270 | ν14 = 70.6 | |
| R27 = ∞ | D27 = 0.50 | N15 = 1.494000 | ν15 = 75.0 | |
| R28 = ∞ | D28 = 0.80 | | | |
| R29 = ∞ | D29 = 0.50 | N16 = 1.498310 | ν16 = 65.1 | |
| R30 = ∞ | | | | |

| | focal length | | |
|---|---|---|---|
| variable interval | 6.10 | 39.17 | 117.00 |
| D7 | 0.80 | 25.97 | 35.16 |
| D13 | 28.95 | 7.99 | 2.07 |
| D21 | 6.15 | 3.59 | 17.60 |
| D25 | 8.00 | 16.32 | 1.51 |

Aspherical Coefficients

R15: k=−3.65320 B=4.60770e−4 C=−5.65097e−6
 D=1.00362e−7 E=−1.06006e−9

R25: k=1.42111e+01 B=1.01907e−04 C=4.57497e−07
 D=5.24065e−9

Phase Coefficient
C2=−8.27465e−5

Second Numerical Example

| f = 6.10 to 90.03, Fno = 2.85 to 3.96, 2ω = 60.6° to 4.5° | | | |
|---|---|---|---|
| R1 = 80.481 | D1 = 1.50 | N1 = 1.805181 | ν1 = 25.4 |
| R2 = 35.918 | D2 = 4.50 | N2 = 1.603112 | ν2 = 60.6 |
| (diffractive optical part) | | | |
| R3 = 523.890 | D3 = 0.20 | | |
| R4 = 40.005 | D4 = 3.40 | N3 = 1.806098 | ν3 = 40.9 |
| R5 = 138.940 | D5 = variable | | |
| R6 = 48.864 | D6 = 0.90 | N4 = 1.882997 | ν4 = 40.8 |
| R7 = 8.998 | D7 = 4.84 | | |

-continued f = 6.10 to 90.03, Fno = 2.85 to 3.96, 2ω = 60.6° to 4.5°

| | | | | |
|---|---|---|---|---|
| R8 = −28.826 | D8 = 0.75 | N5 = 1.487490 | ν5 = 70.2 | |
| R9 = 23.395 | D9 = 0.20 | | | |
| R10 = 15.368 | D10 = 1.90 | N6 = 1.922860 | ν6 = 18.9 | |
| R11 = 33.013 | D11 = variable | | | |
| R12 = aperture | D12 = 8.83 | | | |
| R13 = 8.721 | D13 = 2.50 | N7 = 1.772499 | ν7 = 49.6 | |
| R14 = 92.267 | D14 = 1.85 | | | |
| R15 = 16.423 | D15 = 0.70 | N8 = 1.846660 | ν8 = 23.9 | |
| R16 = 6.518 | D16 = 0.98 | | | |
| R17 = 16.179 | D17 = 1.40 | N9 = 1.487490 | ν9 = 70.2 | |
| R18 = 57.994 | D18 = 1.80 | | | |
| R19 = ∞ | D19 = variable | | | |
| R20 = 16.008 | D20 = 2.50 | N10 = 1.496999 | ν10 = 81.5 | |
| R21 = −46.532 | D21 = 0.75 | N11 = 1.761821 | ν11 = 26.5 | θgF = 0.701 |
| R22 = −15.896 | D22 = 0.60 | N12 = 1.846660 | ν12 = 23.9 | |
| R23 = −38.630 | D23 = variable | | | |
| R24 = ∞ | D24 = 0.30 | N13 = 1.544270 | ν13 = 70.6 | |
| R25 = ∞ | D25 = 0.50 | N14 = 1.494000 | ν14 = 75.0 | |
| R26 = ∞ | D26 = 0.80 | | | |
| R27 = ∞ | D27 = 0.50 | N15 = 1.498310 | ν15 = 65.1 | |
| R28 = ∞ | | | | |

| | focal length | | |
|---|---|---|---|
| variable interval | 6.10 | 36.29 | 90.03 |
| D5 | 0.90 | 27.29 | 36.73 |
| D11 | 31.79 | 9.01 | 2.58 |
| D19 | 4.18 | 3.87 | 13.43 |
| D23 | 5.00 | 11.07 | 0.70 |

Aspherical Coefficients

R13:  k=−1.8060  B=2.3785e−4  C=−5.2576e−7
 D=1.07052e−8 E=−1.06054e−10

R23:  k=2.10086  B=1.62706e−6  C=−4.24617e−7
 D=−7.19769e−10

Phase Coefficient
C2=−1.36157e−4

Third Numerical Example f = 27.81 to 130.65, Fno = 4.12 to 5.77, 2ω = 75.8° to 18.8°

| | | | |
|---|---|---|---|
| R1 = 155.787 | D1 = 3.70 | N1 = 1.846660 | ν1 = 23.9 |
| R2 = 77.675 | D2 = 11.50 | N2 = 1.622992 | ν2 = 58.2 |
| (diffractive optical part) | | | |
| R3 = 1816.968 | D3 = 0.20 | | |
| R4 = 63.954 | D4 = 8.00 | N3 = 1.712995 | ν3 = 53.9 |
| R5 = 165.120 | D5 = variable | | |
| R6 = 99.211 | D6 = 1.90 | N4 = 1.772499 | ν4 = 49.6 |
| R7 = 15.912 | D7 = 8.71 | | |
| R8 = −115.032 | D8 = 1.00 | N5 = 1.882997 | ν5 = 40.8 |
| R9 = 52.320 | D9 = 0.24 | | |
| R10 = 26.129 | D10 = 6.18 | N6 = 1.805181 | ν6 = 25.4 |
| R11 = −77.759 | D11 = 0.55 | | |
| R12 = −46.788 | D12 = 1.58 | N7 = 1.670029 | ν7 = 47.2 |
| R13 = 54.512 | D13 = variable | | |
| R14 = aperture | D14 = 5.27 | | |
| R15 = 90.939 | D15 = 1.20 | N8 = 1.712995 | ν8 = 53.9 |
| R16 = 22.432 | D16 = 4.80 | N9 = 1.487490 | ν9 = 70.2 |
| R17 = −75.648 | D17 = 0.20 | | |
| R18 = 35.936 | D18 = 6.00 | N10 = 1.487490 | ν10 = 70.2 |
| R19 = −18.522 | D19 = 1.10 | N11 = 1.698947 | ν11 = 30.1 |
| R20 = −28.821 | D20 = variable | | |

-continued f = 27.81 to 130.65, Fno = 4.12 to 5.77, 2ω = 75.8° to 18.8°

| | | | |
|---|---|---|---|
| R21 = −108.656 | D21 = 3.30 | N12 = 1.805181 | ν12 = 25.4 |
| R22 = −26.521 | D22 = 1.20 | N13 = 1.743997 | ν13 = 44.8 |
| R23 = 101.143 | D23 = 7.68 | | |
| R24 = −28.961 | D24 = 1.90 | N14 = 1.603112 | ν14 = 60.6 |
| R25 = −54.533 | D25 = variable | | |
| R26 = 118.960 | D26 = 9.00 | N15 = 1.570989 | ν15 = 50.8 |
| R27 = −34.718 | D27 = 0.30 | | |
| R28 = −245.511 | D28 = 8.10 | N16 = 1.496999 | ν16 = 81.5 |
| R29 = −28.299 | D29 = 3.20 | N17 = 1.63555 | ν17 = 22.7   θgF = 0.689 |
| R30 = −22.015 | D30 = 2.00 | N18 = 1.846660 | ν18 = 23.9 |
| R31 = −56.593 | D31 = variable | | |

| | focal length | | |
|---|---|---|---|
| variable interval | 27.81 | 88.15 | 130.65 |
| D5 | 3.00 | 36.32 | 47.68 |
| D13 | 23.82 | 9.04 | 2.92 |
| D20 | 2.09 | 12.50 | 14.15 |
| D25 | 14.70 | 3.92 | 2.16 |

Aspherical Coefficients

R27:  k=−6.98542e−2  B=1.62029e−6  C=−1.96781e−9
  D=2.81192e−12 E=−1.20730e−14

Phase Coefficient

C2=−2.48754e−5

Fourth Numerical Example f = 24.70 to 100.00, Fno = 4.12 to 5.77, 2ω = 82.4° to 24.4°

| | | | |
|---|---|---|---|
| R1 = 140.391 | D1 = 3.50 | N1 = 1.846660 | ν1 = 23.9 |
| R2 = 72.128 | D2 = variable | | |
| (diffractive optical part) | | | |
| R3 = 76.150 | D3 = 10.20 | N2 = 1.622992 | ν2 = 58.2 |
| R4 = 387.369 | D4 = 0.18 | | |
| R5 = 64.630 | D5 = 7.30 | N3 = 1.712995 | ν3 = 53.9 |
| R6 = 178.513 | D6 = variable | | |
| R7 = 94.225 | D7 = 1.90 | N4 = 1.772499 | ν4 = 49.6 |
| R8 = 16.108 | D8 = 9.13 | | |
| R9 = −181.139 | D9 = 1.30 | N5 = 1.882997 | ν5 = 40.8 |
| R10 = 42.713 | D10 = 0.20 | | |
| R11 = 25.526 | D11 = 6.30 | N6 = 1.805181 | ν6 = 25.4 |
| R12 = −111.990 | D12 = 0.50 | | |
| R13 = −73.009 | D13 = 1.30 | N7 = 1.666718 | ν7 = 48.3 |
| R14 = 50.888 | D14 = variable | | |
| R15 = aperture | D15 = 4.86 | | |
| R16 = 113.251 | D16 = 1.20 | N8 = 1.712995 | ν8 = 53.9 |
| R17 = 26.489 | D17 = 4.40 | N9 = 1.487490 | ν9 = 70.2 |
| R18 = −44.341 | D18 = 0.20 | | |
| R19 = 32.653 | D19 = 5.50 | N10 = 1.487490 | ν10 = 70.2 |
| R20 = −18.337 | D20 = 1.00 | N11 = 1.688931 | ν11 = 31.1 |
| R21 = −30.856 | D21 = variable | | |
| R22 = −64.763 | D22 = 3.00 | N12 = 1.805181 | ν12 = 25.4 |
| R23 = −21.090 | D23 = 1.00 | N13 = 1.743997 | ν13 = 44.8 |
| R24 = 121.610 | D24 = 7.08 | | |
| R25 = −38.363 | D25 = 1.80 | N14 = 1.603112 | ν14 = 60.6 |
| R26 = −90.966 | D26 = variable | | |
| R27 = −303.487 | D27 = 7.20 | N15 = 1.570989 | ν15 = 50.8 |
| R28 = −32.726 | D28 = 0.20 | | |
| R29 = 274.537 | D29 = 7.90 | N16 = 1.496999 | ν16 = 81.5 |

-continued f = 24.70 to 100.00, Fno = 4.12 to 5.77, 2ω = 82.4° to 24.4°

| R30 = −26.510 | D30 = 3.00 | N17 = 1.63555 | ν17 = 22.7 | θgF = 0.689 |
| R31 = −20.376 | D31 = 1.80 | N18 = 1.846660 | ν18 = 23.9 | |
| R32 = −51.294 | D32 = variable | | | |

| | focal length | | |
| --- | --- | --- | --- |
| variable interval | 24.70 | 77.06 | 100.00 |
| D2 | 10.14 | 3.67 | 5.29 |
| D6 | 2.76 | 37.32 | 46.58 |
| D14 | 27.46 | 8.39 | 3.50 |
| D21 | 1.92 | 11.00 | 12.37 |
| D26 | 13.56 | 3.61 | 1.99 |

Aspherical Coefficients
R28: k=4.31517e−1  B=1.67864e−6  C=−1.71793e−9
    D=8.15241e−12 E=−3.72129e−14

Phase Coefficient
C2=−1.60416e−5

TABLE 1

| | Conditional Expression | | | |
| --- | --- | --- | --- | --- |
| Example | (1) | (2) | (3) | (4) |
| 1 | 0.7795 | 188.75 | 8.931 | 194.72 |
| 2 | 0.7837 | 165.34 | 6.197 | 111.57 |
| 3 | 0.7930 | 262.67 | 4.683 | 314.47 |
| 4 | 0.7930 | 455.54 | 4.714 | 722.15 |

In each numerical example, a high performance zoom lens with a high zoom ratio in which the chromatic aberrations are adequately corrected and which can be used in a digital camera or a video camera is obtained.

Next, a digital camera (image pickup apparatus) including the zoom lens according to an embodiment of the present invention as a photographing optical system will be described below with reference to FIG. 22.

With reference to FIG. 22, the digital camera includes a camera body 20; a photographing optical system 21 including the zoom lens according to an embodiment of the present invention; a solid-state image pickup element (photoelectric conversion element) 22, such as a CCD, that receives an object image formed by the photographing optical system 21; a memory 23 that records information corresponding to the object image received by the image pickup element 22; and a finder 24 for observing the object image displayed on a display unit (not shown).

The display unit includes a liquid crystal display panel or the like and displays the object image formed on the image pickup element 22.

Thus, a small, high-optical-performance image pickup apparatus, such as a digital camera, is obtained by using the zoom lens according to the embodiment of the present invention.

The present invention can also be applied to a single-lens reflex camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-336968 filed Dec. 14, 2006, which is hereby incorporated by reference herein in its entirety.

What is claimed is:

1. A zoom lens that performs zooming by moving a plurality of lens units, the zoom lens comprising:
    a front lens unit disposed on an object side of an aperture stop, the front lens unit including at least one diffractive optical part having positive power; and
    a rear lens unit disposed on an image side of the aperture stop, the rear lens unit including at least one refractive optical element made of a solid material and having a positive refractive power,
    wherein, when νd and θgF are the Abbe number and the partial dispersion ratio, respectively, of the material of the refractive optical element, and fD and fN are the focal lengths of the diffractive optical part and the refractive optical element, respectively, in air, the following expressions are satisfied:

$0.755 < \theta gF - (-1.665 \times 10^{-7} \cdot \nu d^3 + 5.213 \times 10^{-5} \cdot \nu d^2 - 5.656 \times 10^{-3} \cdot \nu d) < 1.011$, and $80 < fD/fN < 800$.

2. The zoom lens according to claim 1, wherein, when fw is the focal length of the overall system at the wide-angle end, the following expression is satisfied:

$3.0 < fN/fw < 12.0$.

3. The zoom lens according to claim 1, wherein, when fP is the focal length of a positive lens nearest to the object side in air, the following expression is satisfied:

$50 < fD/fP < 1000$.

4. The zoom lens according to claim 1,
    wherein the front lens unit includes a first lens unit having a positive refractive power and a second lens unit having a negative refractive power in order from the object side to the image side, and
    wherein the rear lens unit includes a third lens unit having a positive refractive power and a fourth lens unit having a positive refractive power in order from the object side to the image side.

5. The zoom lens according to claim 1,
    wherein the front lens unit includes a first lens unit having a positive refractive power and a second lens unit having a negative refractive power in order from the object side to the image side, and
    wherein the rear lens unit includes a third lens unit having a positive refractive power, a fourth lens unit having a negative refractive power, and a fifth lens unit having a positive refractive power in order from the object side to the image side.

6. The zoom lens according to claim 1,
wherein the front lens unit includes a first lens unit having a negative refractive power, a second lens unit having a positive refractive power, and a third lens unit having a negative refractive power in order from the object side to the image side, and
wherein the rear lens unit includes a fourth lens unit having a positive refractive power, a fifth lens unit having a negative refractive power, and a sixth lens unit having a positive refractive power in order from the object side to the image side.

7. An image pickup apparatus comprising:
the zoom lens system according to claim 1; and
a photoelectric conversion element arranged to receive an image formed by the zoom lens.

* * * * *